(12) United States Patent
Hwang et al.

(10) Patent No.: US 10,750,159 B2
(45) Date of Patent: Aug. 18, 2020

(54) 3D IMAGE DISPLAY APPARATUS AND IMAGE DISPLAY METHOD THEREOF

(71) Applicant: SAMSUNG ELECTRONICS CO., LTD., Suwon-si (KR)

(72) Inventors: Seon-deok Hwang, Seoul (KR); Seung-jun Jeong, Hwaseong-si (KR); Kyung-hoon Cha, Seoul (KR); Farid Mukhtarov, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 525 days.

(21) Appl. No.: 14/879,224

(22) Filed: Oct. 9, 2015

(65) Prior Publication Data
US 2016/0337637 A1 Nov. 17, 2016

(30) Foreign Application Priority Data

May 14, 2015 (KR) .................. 10-2015-0067335

(51) Int. Cl.
*G02F 1/1335* (2006.01)
*H04N 13/32* (2018.01)
(Continued)

(52) U.S. Cl.
CPC ............. *H04N 13/32* (2018.05); *G02B 6/003* (2013.01); *G02B 6/0036* (2013.01);
(Continued)

(58) Field of Classification Search
CPC .. G02B 6/0068; G02B 6/0038; G02B 6/0036; G02B 6/0053; G02B 6/0055;
(Continued)

(56) References Cited

U.S. PATENT DOCUMENTS 8,218,096 B2 7/2012 Cha et al.
8,531,625 B2 9/2013 Sohn et al.
(Continued)

FOREIGN PATENT DOCUMENTS

CN 102868893 A 1/2013
CN 103246108 A 8/2013
(Continued)

OTHER PUBLICATIONS

Search Report dated Sep. 23, 2016 issued by the International Searching Authority in counterpart International Application No. PCT/KR2016/003967 (PCT/ISA/210).
(Continued)

*Primary Examiner* — Thoi V Duong
(74) *Attorney, Agent, or Firm* — Sughrue Mion, PLLC

(57) ABSTRACT

A three-dimensional (3D) image display apparatus includes a display panel configured to display a 3D image; a light guide panel disposed on a rear surface of the display panel to emit light to the display panel; a first light source configured to irradiate light toward the light guide panel; a second light source configured to irradiate light toward the light guide panel; and a controller configured to control the first light source and the second light source to emit light alternately, wherein the light guide panel includes a first pattern which responds to the first light source and does not respond to the second light source, and a second pattern which responds to the second light source and does not respond to the first light source.

26 Claims, 19 Drawing Sheets

(51) Int. Cl.
*F21V 8/00* (2006.01)
*H04N 13/315* (2018.01)
*G02F 1/13357* (2006.01)

(52) U.S. Cl.
CPC ......... *G02B 6/0038* (2013.01); *G02B 6/0068* (2013.01); *G02F 1/133512* (2013.01); *G02F 1/133553* (2013.01); *H04N 13/315* (2018.05); *G02F 1/133615* (2013.01)

(58) Field of Classification Search
CPC .... G02B 6/0061; G02B 6/0031; G02B 6/005; G02B 6/0051; G02B 6/003; G02B 6/0088; G02B 6/0091; G02B 6/00; G02B 6/0025; G02B 6/0028; G02B 6/0016; G02B 6/0018; G02B 6/004; G02B 6/0066; G02B 6/0073; G02B 27/2214; G02B 27/22; G02B 27/225; G02B 27/2235; G02B 27/0961; G02B 27/0972; G02B 27/2228; G02B 27/24; G02B 3/005; G02B 3/0006; G02B 5/045; G02B 5/0231; G02B 2027/0134; G02B 5/0215; G02B 5/0284; H04N 13/32; H04N 13/398; H04N 13/356; H04N 13/296; H04N 13/305; H04N 13/315; G02F 1/133615; G02F 1/133602; G02F 1/133606; G02F 1/1336; G02F 1/133603; G02F 1/0105; G02F 1/1335; G02F 1/133512; G02F 1/133526; G02F 1/133553; G02F 1/133604; G02F 1/133605; G02F 1/133611; G02F 2001/133613; G02F 1/1333; G02F 1/133504; B60K 2350/2017; B60K 2350/203; B60K 2350/2039
See application file for complete search history.

(56) References Cited

U.S. PATENT DOCUMENTS

| | | | |
|---|---|---|---|
| 8,820,997 B2 | 9/2014 | Minami | |
| 9,285,597 B2 | 3/2016 | Minami | |
| 9,400,347 B2 | 7/2016 | Sugiyama et al. | |
| 10,012,788 B2 | 7/2018 | Yu et al. | |
| 10,173,131 B2* | 1/2019 | Fujita | A63F 13/25 |
| 2003/0227768 A1 | 12/2003 | Hara et al. | |
| 2007/0252923 A1 | 11/2007 | Hwang et al. | |
| 2008/0013015 A1* | 1/2008 | Joo | G02B 6/0036 |
| | | | 349/65 |
| 2008/0297671 A1* | 12/2008 | Cha | G09G 3/003 |
| | | | 349/15 |
| 2009/0316433 A1* | 12/2009 | Shim | G02B 6/0038 |
| | | | 362/613 |
| 2011/0149202 A1* | 6/2011 | Sohn | G02B 6/0036 |
| | | | 349/62 |
| 2011/0157111 A1* | 6/2011 | Lee | G09G 3/3406 |
| | | | 345/205 |
| 2011/0317261 A1 | 12/2011 | Minami et al. | |
| 2012/0075698 A1* | 3/2012 | Minami | G02B 6/0043 |
| | | | 359/462 |
| 2012/0105767 A1* | 5/2012 | Choi | G02B 6/0038 |
| | | | 349/62 |
| 2012/0236403 A1* | 9/2012 | Sykora | G02B 27/2214 |
| | | | 359/463 |
| 2013/0114300 A1 | 5/2013 | Lee et al. | |
| 2013/0181895 A1 | 7/2013 | Kim et al. | |
| 2013/0286678 A1 | 10/2013 | Sugiyama et al. | |
| 2014/0160562 A1 | 6/2014 | Minami | |
| 2014/0286043 A1* | 9/2014 | Sykora | G02B 3/0062 |
| | | | 362/607 |
| 2015/0043198 A1 | 2/2015 | Hwang et al. | |
| 2016/0054601 A1* | 2/2016 | Kitamura | G02B 6/0036 |
| | | | 349/33 |
| 2016/0245984 A1 | 8/2016 | Yu et al. | |
| 2016/0306097 A1* | 10/2016 | Fujita | G09G 3/003 |

FOREIGN PATENT DOCUMENTS

| | | |
|---|---|---|
| CN | 103299358 A | 9/2013 |
| CN | 104199192 A | 12/2014 |
| JP | 2004-336104 A | 11/2004 |
| JP | 2010-164852 A | 7/2010 |
| KR | 10-2007-0105766 A | 10/2007 |
| KR | 10-2008-0105389 A | 12/2008 |
| KR | 10-2011-0069590 A | 6/2011 |
| KR | 10-2012-0031886 A | 4/2012 |
| KR | 10-2012-0106531 A | 9/2012 |
| KR | 10-2013-0084508 A | 7/2013 |
| KR | 10-2014-0040378 A | 4/2014 |

OTHER PUBLICATIONS

Written Opinion dated Sep. 23, 2016 issued by the International Searching Authority in counterpart International Application No. PCT/KR2016/003967 (PCT/ISA/237).
Communication dated Oct. 8, 2019 by the State Intellectual Property Office of P.R. China in counterpart Chinese Patent Application No. 201610081339.8.
Communication dated Aug. 9, 2019 by the Korean Intellectual Property Office in counterpart Korean Patent Application No. 10-2015-0067335.
Communication dated Feb. 4, 2020, issued by the Korean Intellectual Property Office in corresponding Korean Application No. 10-2015-0067335.

* cited by examiner

3D IMAGE DISPLAY APPARATUS AND IMAGE DISPLAY METHOD THEREOF

CROSS-REFERENCE TO RELATED APPLICATION(S)

This application claims priority from Korean Patent Application No. 10-2015-0067335, filed on May 14, 2015, in the Korean Intellectual Property Office, the disclosure of which is incorporated herein by reference in its entirety.

BACKGROUND

Field

Methods and apparatuses consistent with one or more exemplary embodiments relate to a 3-dimensional (3D) image display apparatus, and more particularly, to a 3D image display apparatus that can enhance resolution by changing a shape and arrangement of a pattern in a light guide panel and controlling light emission of a light source.

Description of the Related Art

A method for realizing a 3D image includes using a binocular disparity of a viewer. The 3D image realizing method using the binocular disparity includes a stereoscopic method and an autostereoscopic method.

The stereoscopic method uses glasses such as polarized glasses, LC shutter glasses, etc., to display a 3D image. Such a stereoscopic method uses a polarized projector and may be used in a place where many people view images, such as a theater. The autostereoscopic method uses a lenticular lens, a parallax barrier, parallax illumination, etc., to allow users to view images with their naked eyes. Such an autostereoscopic method may be applied to a game display, a home TV, an exhibition display, etc., and may be used by individuals or a few persons.

SUMMARY

A 3D image display apparatus which uses a parallax barrier of the autostereoscopic method has patterns formed in a light guide panel at regular intervals. A display panel displays a 3D image by allowing the light reflected by the patterns in a predetermined direction to pass therethrough. Therefore, a viewer can view the 3D image by viewing images of corresponding view points with the viewer's left and right eyes at a viewing location.

This type of 3D image display apparatus uses a line source which is generated in the light guide panel. However, because the number of pixels viewed through the line source is limited, there is a problem that resolution is reduced.

Exemplary embodiments may overcome the above disadvantages and other disadvantages not described above. Exemplary embodiments are not required to overcome the disadvantages described above, and an exemplary embodiment may not overcome any of the problems described above.

One or more exemplary embodiments provide a 3D image display apparatus that can enhance resolution by changing a configuration and arrangement of patterns formed in a light guide panel, and driving a light source serially.

According to an aspect of an exemplary embodiment, there is provided a three-dimensional (3D) image display apparatus including: a display panel configured to display a 3D image; a light guide panel disposed on a rear surface of the display panel and configured to emit light toward the display panel; a first light source configured to irradiate light toward the light guide panel; a second light source configured to irradiate light toward the light guide panel; and a controller configured to control the first light source and the second light source to emit light alternately, wherein the light guide panel includes a first pattern configured to reflect the light from the first light source in a direction within a predetermined threshold range with respect to a direction perpendicular to the light guide panel, and reflect the light from the second light source in a direction that is outside of the predetermined threshold range, and a second pattern configured to reflect the light from the second light source in a direction within a predetermined threshold range with respect to a direction perpendicular to the light guide panel, and reflect the light from the first light source in a direction that is outside of the predetermined threshold range.

The first light source and the second light source may be disposed adjacent to a first side of the light guide panel.

The first light source may be disposed adjacent to a first side of the light guide panel and the second light source may be disposed adjacent to a second side of the light guide panel.

The light guide panel may be disposed between the first light source and the second light source.

The first pattern and the second pattern may have cross sections that are asymmetrical triangles.

The first pattern and the second pattern have cross sections that are symmetrical to each other.

The first pattern and the second pattern may have cross sections in a shape of ovals.

The first pattern may include a first surface and a second surface, and wherein the first surface may be configured to reflect the light irradiated from the first light source in a direction within the predetermined threshold range, and emit the light to outside of the light guide panel, and the second surface may be configured to reflect the light irradiated from the second light source in a direction that is outside of the predetermined threshold range.

The second pattern may include a first surface and a second surface, and wherein the first surface may be configured to reflect the light irradiated from the second light source in a direction within the predetermined threshold range, and emit the light to an outside of the light guide panel, and the second surface may be configured to reflect the light irradiated from the first light source in a direction that is outside of the predetermined threshold range.

A view point image displayed on the display panel based on the light emitted from the first light source and a view point image displayed on the display panel based on the light emitted from the second light source may correspond to images of a same view point.

The first pattern and the second pattern may be alternately formed in the light guide panel.

A protrusion and a depression may be alternately formed in the light guide panel, and the first pattern and the second pattern are formed in the protrusion.

The 3D image display apparatus may include a collimator lens disposed between the first light source and the light guide panel.

The first pattern may include a plurality of sub patterns, and a density of the sub patterns may be changed according to a distance from the first light source.

The light guide panel may be disposed in parallel with the display panel.

The first light source may be configured to emit light having a first wavelength and the second light source may be configured to emit light having a second wavelength, and wherein the first pattern may be configured to respond to the light having the first wavelength and may be configured to not respond to the light having the second wavelength, and the second pattern may be configured to respond to the light having the second wavelength and may be configured to not respond to the light having the first wavelength.

The 3D image display apparatus may include a third light source disposed adjacent to a third side of the light guide panel; and a fourth light source disposed adjacent to a fourth side of the light guide panel facing the third light source, wherein the light guide panel further includes a third pattern and a fourth pattern formed therein, wherein the third pattern may be configured to reflect the light from the third light source in a direction within the predetermined threshold range, and the fourth pattern may be configured to reflect the light from the fourth light source in a direction within the predetermined threshold range.

The controller may be configured to control the first light source, the second light source, the third light source, and the fourth light source to emit light alternately.

The 3D image display apparatus may include a second backlight disposed on a rear surface of the light guide panel configured to display a two-dimensional (2D) image on the display panel; and a film member disposed between the light guide panel and the second backlight and configured to reflect the light emitted from the first light source or the second light source and to allow the light emitted from the second backlight to pass through.

The 3D image display apparatus may include a second backlight disposed on a rear surface of the light guide panel configured to display a two-dimensional (2D) image on the display panel; and a film member disposed between the light guide panel and the second backlight and configured to block the light emitted from the first light source or the second light source and to allow the light emitted from the second backlight to pass through.

According to an aspect of another exemplary embodiment, there is provided a three-dimensional (3D) image display method of a 3D image display apparatus, which displays a multi-view image on a display panel by emitting first line light and second line light from a light guide panel, which is disposed on a rear surface of the display panel and in which a first pattern and a second pattern are formed, the method including: driving the first light source to irradiate light toward the light guide panel and generating the first line light from the first pattern reflecting the light from the first light source in a direction within a predetermined threshold range with respect to a direction perpendicular to the light guide panel; displaying a first image corresponding to a first view point on the display panel using the first line light; turning off the first light source, and driving the second light source to irradiate light toward the light guide panel, and generating the second line light from the second pattern reflecting the light from the second light source in a direction within a predetermined threshold range with respect to a direction perpendicular to the light guide panel; and displaying a second image corresponding to the first view point on the display panel using the second line light.

According to an aspect of another exemplary embodiment, there is provided a light guide panel in a three-dimensional (3D) image display apparatus, the light guide panel including: a first light source disposed at a first edge of the light guide panel and configured to emit light toward the light guide panel, and a second light source disposed at a second edge of the light guide panel and configured to emit light toward the light guide panel; a first pattern configured to reflect the light from the first light source in a direction within a predetermined threshold range with respect to a direction perpendicular to the light guide panel, and reflect the light from the second light source in a direction that is outside of the predetermined threshold range; and a second pattern configured to reflect the light from the second light source in a direction within a predetermined threshold range with respect to a direction perpendicular to the light guide panel and reflect the light from the first light source in a direction that is outside of the predetermined threshold range.

The light guide panel may include a third light source disposed at a third edge of the light guide panel and configured to emit light toward the light guide panel and a fourth light source disposed at a fourth edge of the light guide panel and configured to emit light toward the light guide panel; a third pattern configured to reflect the light from the third light source in a direction within a predetermined threshold range with respect to a direction perpendicular to the light guide panel, and reflect the light from the fourth light source in a direction that is outside of the predetermined threshold range; and a fourth pattern configured to reflect the light from the fourth light source in a direction within a predetermined threshold range with respect to a direction perpendicular to the light guide panel and reflect the light from the third light source in a direction that is outside of the predetermined threshold range.

The first pattern may be configured to respond to light having a first wavelength and may be configured to not respond to light having a second wavelength that may be different from the first wavelength, and the second pattern may be configured to respond to the light having the second wavelength and may be configured to not respond to the light having the first wavelength.

The first pattern may be configured to respond to light having a first wavelength and may be configured to not respond to light having a second wavelength that may be different from the first wavelength; the second pattern may be configured to respond to the light having the second wavelength and may be configured to not respond to the light having the first wavelength; the third pattern may be configured to respond to light having a third wavelength and may be configured to not respond to light having a fourth wavelength; and the fourth pattern may be configured to respond to the light having the fourth wavelength and may be configured to not respond to the light having the third wavelength.

The first pattern, the second pattern, the third pattern, and the fourth pattern may have cross sections in a shape of ovals.

According to one or more exemplary embodiments, the 3D image display apparatus displays images of the same view points repeatedly by changing configuration and arrangement of patterns formed in the light guide panel and serially driving the light sources, so that resolution is enhanced.

Additional and/or other aspects of the one or more exemplary embodiments will be set forth in part in the description which follows and, in part, will be obvious from the description, or may be learned by practice of the disclosure.

BRIEF DESCRIPTION OF THE DRAWINGS

The above and/or other aspects will be more apparent by describing one or more exemplary embodiments with reference to the accompanying drawings, in which.

DETAILED DESCRIPTION OF EXEMPLARY EMBODIMENTS

Figure 1:
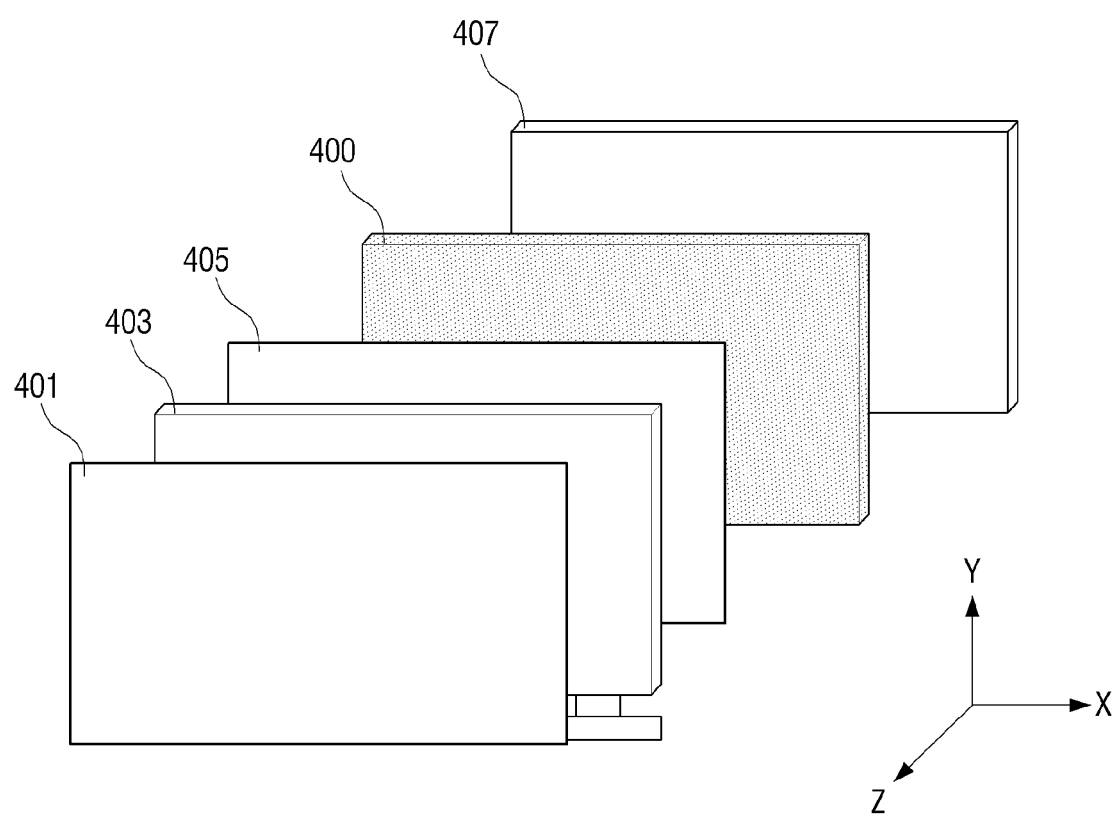
FIG. 1 is a view showing a configuration of a 3D image display apparatus according to an exemplary embodiment.

Exemplary embodiments will be described below with reference to the accompanying drawings. However, one or more exemplary embodiments are not limited and should be construed as including any modification, equivalent and/or alternative of exemplary embodiments. In the drawings, similar reference numerals are used for similar elements.

The terms "have," "may have," "include," and "may include," may indicate the presence of corresponding features but do not preclude the presence of additional features.

Expressions such as "at least one of," when preceding a list of elements, modify the entire list of elements and do not modify the individual elements of the list.

The term such as "first" and "second" may be used for the purpose of distinguishing one element from another element. For example, a first user device and a second user device may indicate different user devices but do not indicate an order or importance. Further, a first element may be named a second element without departing from the scope of one or more exemplary embodiments, and similarly, a second element may be named a first element.

It should be understood that if an element (for example, a first element) is described as being "(operatively or communicatively) coupled with/to" or "connected with" another element (for example, a second element), the element may be directly coupled with/to another element, and/or there may be an intervening element (for example, a third element) between the element and another element. If an element (for example, a first element) is described as being "directly coupled with/to" or "directly connected to" another element (for example, a second element), there is no intervening element (for example, a third element) between the element and another element.

The expression "configured to (or set to)" may be replaced with "suitable for," "having the capacity to," "designed to," "adapted to," "made to," or "capable of" according to a context. However, it is not limited to this. The term "configured to (set to)" does not necessarily mean "specifically designed to" in a hardware level. Instead, the expression "apparatus configured to . . ." may mean that the apparatus is "capable of . . ." along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used herein are for describing exemplary embodiments and are not intended to limit the present disclosure. As used herein, the singular forms are intended to include the plural forms as well, unless the context clearly indicates otherwise. All of the terms used herein including technical or scientific terms have the same meanings as those understood by an ordinary skilled person in the art unless they are defined otherwise. The terms defined in a dictionary should be interpreted as having the same meanings of the relevant technology and should not be interpreted as having ideal or exaggerated meanings unless they are clearly defined.

Below, exemplary embodiments will be explained in detail with reference to the accompanying drawings.

FIG. 1 is a view showing a configuration of a 3D image display apparatus according to an exemplary embodiment. Referring to FIG. 1, polarizing films 401, 405, a display panel 403, and backlights 400, 407 are illustrated.

The polarizing films 401, 405 allow only polarized light of a specific angle or range of angles to pass therethrough, and may adjust transmittance of light by controlling the polarized light. The polarizing films 401, 405 may be disposed on a front surface and a rear surface of the display panel 403.

The display panel 403 may be configured using a 2D display panel of a transmissive type, e.g., a liquid crystal display panel of a transmissive type, and may include a plurality of pixels formed of red (R) pixels, green (G) pixels, and blue (B) pixels. The plurality of pixels are arranged in a matrix pattern.

The display panel 403 may display a 3D image. The display panel 403 selectively converts an image into an image based on 3D image data or an image based on 2D image data, and displays the image. The 3D image data includes a plurality of disparity images corresponding to a plurality of view field directions in 3D display. For example, when binocular 3D display is performed, the 3D image data includes a disparity image for right-eye display and a disparity image for left-eye display. In a 3D image display mode, a composite image including a plurality of stripe type disparity images in a single screen is generated and displayed.

The backlights 400, 407 include a first backlight 400 which is used to display a 3D image, and a second backlight 407 which is used to display a 2D image. The 3D image display apparatus may selectively convert into a 3D display mode or a 2D display mode using the first backlight or the second backlight.

The first backlight 400 may include a light guide panel, a first light source, and a second light source. The light guide panel may be disposed on the rear surface of the display panel and emit light to the display panel 403. The first light source and the second light source are disposed at both sides facing each other with reference to the light guide panel to irradiate light toward the light guide panel in the opposite directions.

On the light guide panel, a first pattern is formed which reflects light in a direction within a predetermined threshold range with reference to a direction perpendicular to the light guide panel (e.g., responds) to the first light source but does not respond to the second light source, and a second pattern is formed which responds to the second light source but does not respond to the first light source.

On the light guide panel, the first pattern which emits the light irradiated from the first light source in a direction within a predetermined threshold range, and emits the light irradiated from the second light source in a direction out of the threshold range, and the second pattern which emits the light irradiated from the second light source in the direction within the predetermined threshold range and emits the light irradiated from the first light source in the direction out of the corresponding threshold range are formed. The direction within the predetermined threshold range refers to a direction within a predetermined threshold range with reference to a direction perpendicular to the light guide panel. For example, the direction within the predetermined threshold range may be a direction within ±20-30 degrees in all directions perpendicular to the light guide panel, but a numerical value for designating the threshold range is not limited to this.

Emitting the light in a predetermined direction refers to emitting incident light in a corresponding direction by various physical phenomena such as reflection, refraction, diffraction, or scattering caused by the patterns formed on the light guide panel. For convenience of explanation, the description below relates to the situation in which light is emitted by the pattern reflection.

Figure 2:
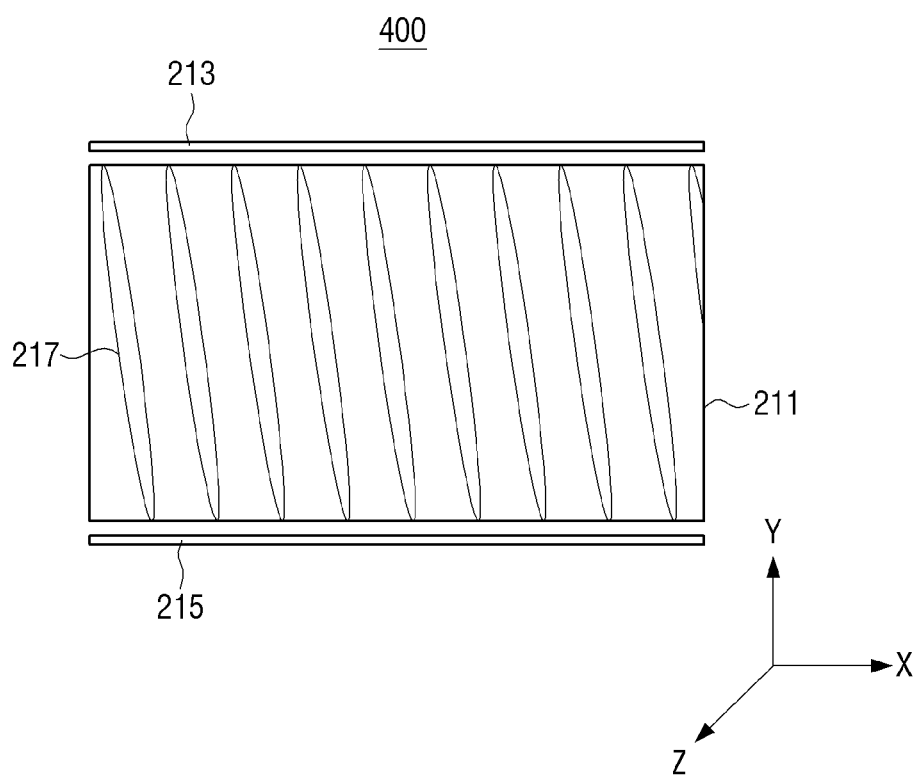
FIG. 2 is a view showing a first backlight according to an exemplary embodiment.

FIG. 2 is a view showing the first backlight 400 according to an exemplary embodiment. The first backlight 400 may be used to display a 3D image. Referring to FIG. 2, the first backlight 400 includes a first light source 213, a second light source 215, and a light guide panel 211, and the light guide panel 211 has patterns 217 formed therein.

For example, the first light source 213 and the second light source 215 may be configured by using a fluorescent lamp such as a Cold Cathode Fluorescent Lamp (CCFL), a Light Emitting Diode (LED), etc. The first light source and the second light source 213 and 215 irradiate light inwardly from the side surfaces of the light guide panel 211.

The light guide panel 211 may be placed in parallel with the display panel and may be formed in a rectangular plate shape. The light guide panel 211 may include a first incidence plane and a second incidence plane through which light enters, an exit plane which connects the first incidence plane and the second incidence plane and through which light exits, a reflection plane which connects the first incidence plane and the second incidence plane and faces the exit plane, and the patterns 217 which are formed on the reflection plane at regular intervals to reflect incident light in a direction within a predetermined threshold range. The direction within the predetermined threshold range refers to a direction perpendicular to the reflection plane or the exit plane of the light guide panel 211. That is, a direction within a predetermined threshold range with reference to a direction (Z-axis direction) perpendicular to the plane of the light guide panel 211 (hereinafter, referred to as a direction perpendicular to the light guide panel 211). For example, the direction within the predetermined threshold range may be a direction within ±20-30 degrees in all directions perpendicular to the light guide panel, but a numerical value for designating the threshold range is not limited to this.

The patterns 217 serve as a prism formed on the reflection plane of the light guide panel 211 and reflect light. The cross section of the patterns 217 may be at least one of a right-angled triangle, an asymmetrical triangle, a trapezoid, and an oval, etc.

The patterns 217 may be formed on the reflection plane of the light guide panel 211 in plural number and may be formed in a 2D arrangement pattern. In addition, the patterns 217 may be formed in a single line shape including a plurality of patterns. That is, a plurality of patterns may constitute a single line and the light guide panel 211 may include a plurality of lines. Because the light reflected in a direction within a predetermined threshold range by the patterns 217 is emitted to the outside of the light guide panel 211, the patterns 217 may operate as a line light source. Herein, the direction in the predetermined threshold range may be a direction within a predetermined threshold range with reference to the direction perpendicular to the light guide panel.

Figure 3:
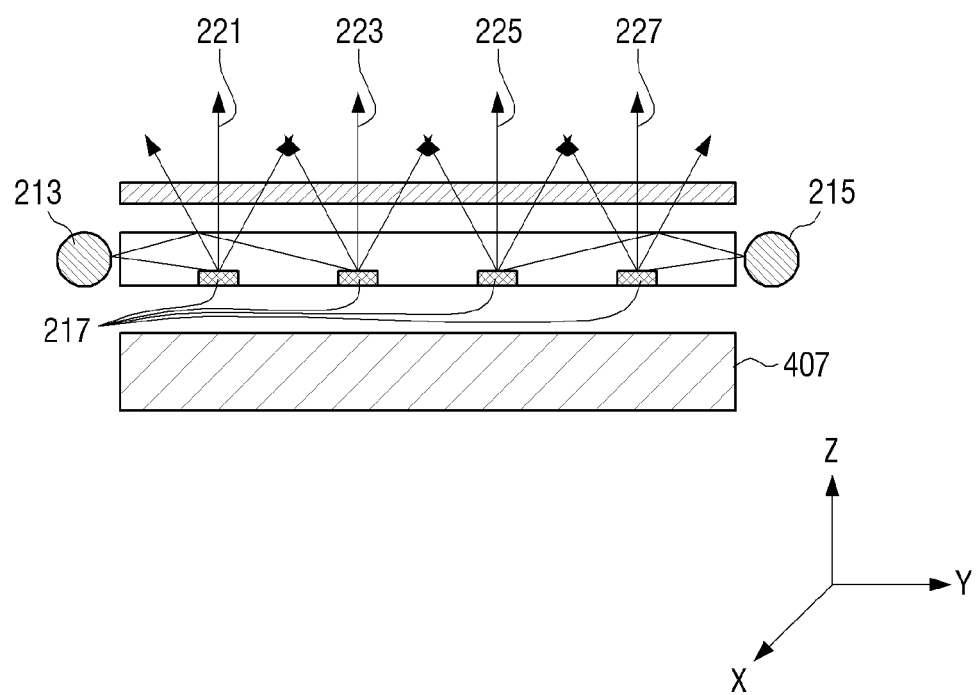
FIG. 3 is a view showing a cross section of a first backlight according to an exemplary embodiment.

FIG. 3 is a view showing the cross section of the first backlight according to an exemplary embodiment. Referring to FIG. 3, the first light source 213, the second light source 215, the patterns 217, and the second backlight 407 are illustrated. The light irradiated from the first light source 213 enters through the incidence plane of the light guide panel, proceeds into the light guide panel, is reflected by the patterns 217 formed on the reflection plane of the light guide panel in the direction within the predetermined threshold range, and is emitted to the outside of the light guide panel. The light 221, 223, 225, and 227 emitted to the outside of the light guide panel emit in corresponding locations of the display panel like line light so that a view point image is displayed on the display panel.

The second backlight 407 operates as a surface light source and emits light to display a 2D image. That is, the second backlight 407 may emit light to display the 2D image, and the first light source 213 and the second light source 215 included in the first backlight may emit light to display the 3D image.

Figure 4:
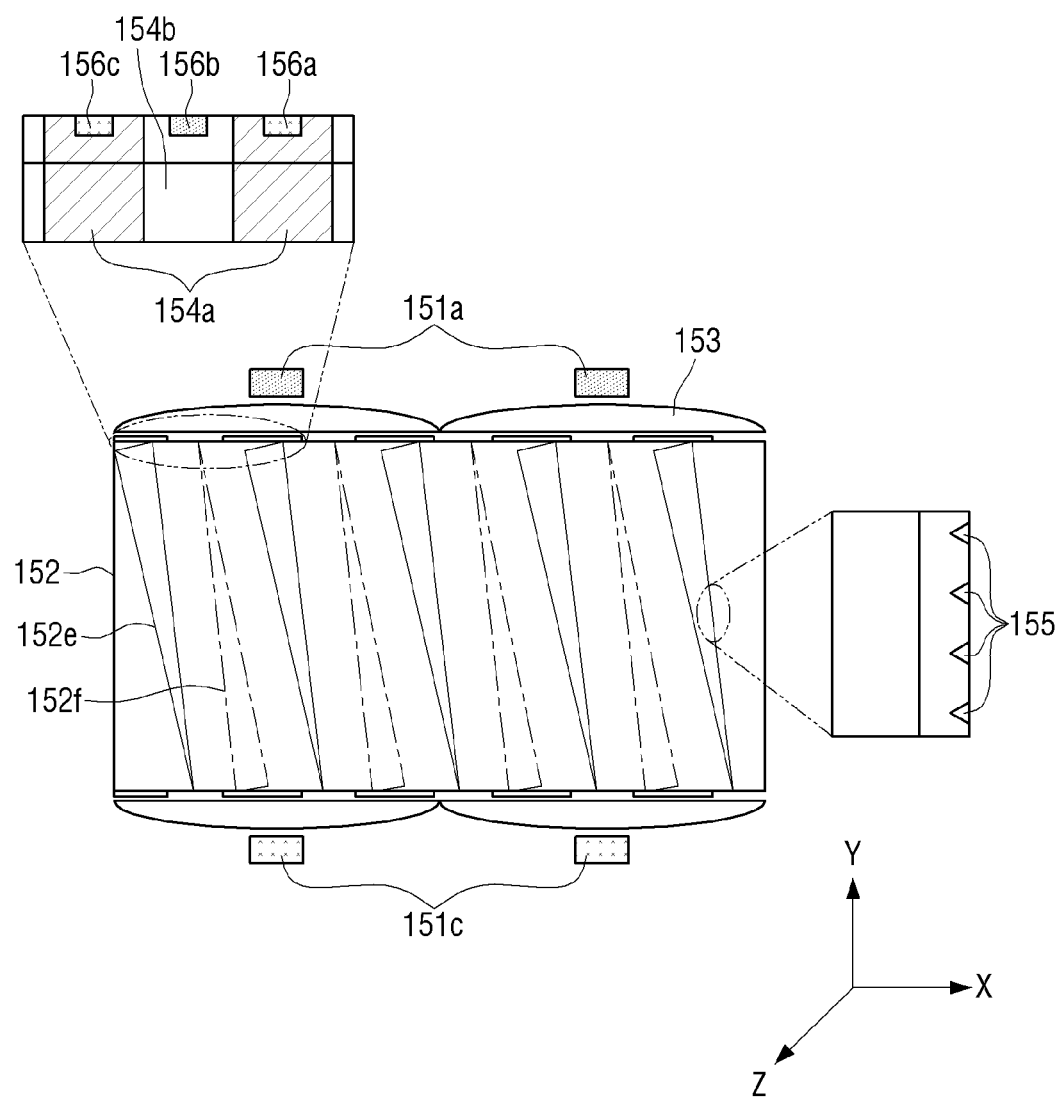
FIG. 4 is a view showing a first pattern and a second pattern which are formed in a light guide panel according to an exemplary embodiment.

FIG. 4 is a view showing a first pattern and a second pattern which are formed on a light guide panel according to an exemplary embodiment.

Referring to FIG. 4, a first light source 151a, a second light source 151c, a collimator lens 153, a mask pattern with mask pattern region 154a and transmissive region 154b, and a light guide panel 152 are illustrated. The first light source 151a may be disposed adjacent to a first side of the light guide panel 152, and the second light source 151c may be disposed adjacent to a second side of the light guide panel 152. In addition, the first light source 151a may be arranged to face the second light source 151c.

The first light source 151a and the second light source 151c may be configured by a plurality of LEDs. The first light source 151a may be disposed above the light guide panel 152 and may irradiate light toward the incidence plane of the light guide panel 152. The second light source 151c may be disposed at the opposite location to the first light source, i.e., under the light guide panel 152, and may irradiate light toward the incidence plane of the light guide panel 152.

The collimator lens 153 may be disposed between the first light source 151a and the light guide panel 152 and between the second light source 151c and the light guide panel 152. The collimator lens 153 may make the light entering the light guide panel 152 from the first light source 151a and the second light source 151c into parallel light.

The mask pattern may be formed on the incidence plane of the light guide panel 152. The mask pattern may block the light. The light passing through the collimator lens 153 may be blocked by the mask pattern and may be irradiated toward a place where there is no mask pattern.

The light guide panel 152 may be formed in a rectangular plate shape. For example, the light guide panel 152 may be formed of a transparent plastic plate of acryl resin. All surfaces other than the inner reflection surface of the light guide panel 152 may be totally transparent. For example, when the light guide panel 152 has a rectangular plate shape, the inner reflection surface and the four side surfaces are totally transparent. The inner reflection surface is mirror-finished to reflect light entering at an incidence angle satisfying a total reflection condition and emit light which does not satisfy the total reflection condition, that is, the light reflected in a direction within a predetermined threshold range with reference to the direction perpendicular to the light guide panel 125, to the outside of the light guide panel.

The light guide panel 152 may include a first pattern 152f and a second pattern 152e which are formed at regular intervals to reflect the incident light in the direction within the predetermined threshold range with reference to the direction perpendicular to the light guide panel 125. The first pattern 152f and the second pattern 152e may be repeatedly formed on the light guide panel 152. That is, the first pattern 152f, the second pattern 152e, the first pattern 152f, the second pattern 152e, . . . may be repeatedly formed serially. In the drawing, the same shape and the same line refer to the same pattern.

The first pattern 152f may include a plurality of sub patterns. That is, the first pattern 152f is a set of a plurality of patterns, and the first pattern refers to a set of a plurality of patterns.

The second pattern 152e may include a plurality of sub patterns. That is, the second pattern 152e is a set of a plurality of patterns, and the second pattern refers to a set of a plurality of patterns.

The shape of the first pattern 152f and the shape of the second pattern 152e may be opposed to each other. For example, the first pattern 152f may be a triangular shape and the second pattern 152e may be an inverted triangular shape as shown in FIG. 4.

The arrangement interval and arrangement density of the sub patterns included in the first pattern 152f may be changed based on a distance from the first light source 151a. For example, the density of the plurality of sub patterns included in the first pattern 152f may become lower as the distance from the first light source 151a decreases, and may become higher as the distance from the first light source 151a increases, as shown in FIG. 4.

The arrangement interval and arrangement density of the sub patterns included in the second pattern 152e may be changed based on a distance from the second light source 151c. For example, the density of the plurality of sub patterns included in the second pattern 152e may become lower as the distance from the second light source 151c decreases, and may become higher as the distance from the second light source 151c increases, as shown in FIG. 4.

Because the density of the plurality of sub patterns arranged varies according to the distance from the light source, the brightness of light emitted from the light guide panel 152 may be uniform in any location.

The cross section of the sub pattern constituting the first pattern 152f may be an asymmetrical triangle. That is, the cross section of the sub pattern of the first pattern 152f may be a triangle with two sides of different lengths or a right-angled triangle. As the lengths of the two sides are different, angles satisfying the total reflection condition of the light entering the respective sides may be different. However, the design is not limited to this. For example, the cross section of the sub pattern constituting the first pattern 152f may be another shape such as an oval or a trapezoid.

The cross section of the sub pattern constituting the second pattern 152e may be an asymmetrical triangle. That is, the cross section of the sub pattern of the second pattern 152e may be a triangle with two sides of different lengths or a right-angled triangle. As the lengths of the two sides are different, angles satisfying the total reflection condition of the light entering the respective sides may be different. However, the design is not limited to this. For example, the cross section of the sub pattern constituting the second pattern 152e may be another shape such as an oval or a trapezoid.

The right view in FIG. 4 is a cross section view enlarging a part of the second pattern 152e. That is, this view illustrates a cross section of the light guide panel cut in the y-axis direction. A plurality of sub patterns 155 are formed in the light guide panel 152.

The cross section of the sub pattern constituting the first pattern 152f and the cross section of the sub pattern constituting the second pattern 152e may be symmetrical with each other. For example, when the cross section of the first pattern 152f is an asymmetrical triangle and the longer side faces the first light source 151a and the shorter side faces the second light source 151c, the cross section of the second pattern 152e is also an asymmetrical triangle and the longer side faces the second light source 151c and the shorter side faces the first light source 151a. The asymmetrical triangle of the cross section of the first pattern 152f and the asymmetrical triangle of the cross section of the second pattern 152e are the same in view of the lengths of the respective sides, but are opposite in view of the direction.

The cross section of the first pattern 152f and the second pattern 152e may be an oval or a trapezoid.

The upper view in FIG. 4 is a view enlarging a part of the incidence plane of the light guide panel. That is, the plurality of sub patterns 156a, 156b, and 156c may be viewed as having a rectangular shape when the light guide panel 152 is viewed in the y-axis direction. A mask pattern region 154a through which light does not pass and a light transmission region 154b may be alternately arranged on the incidence plane of the light guide panel.

Figure 5:
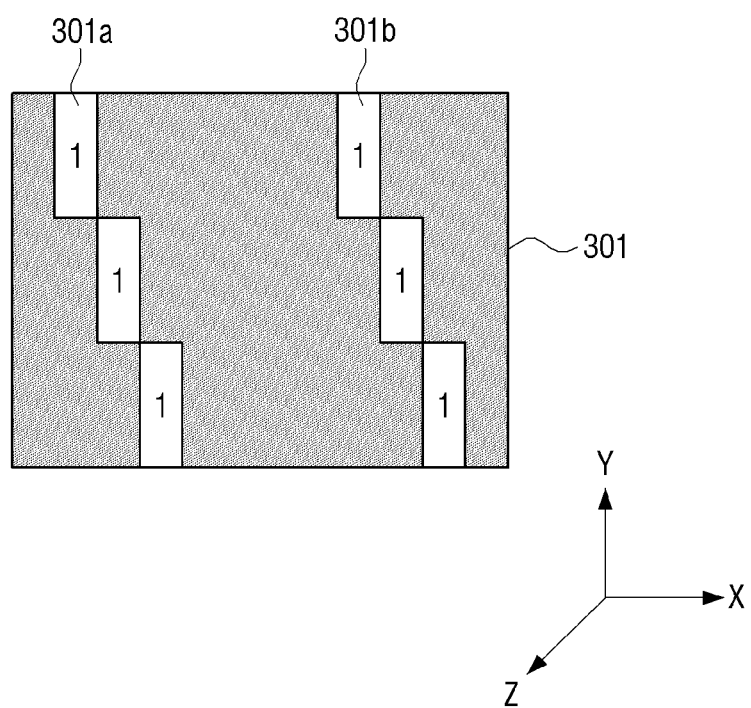
FIG. 5 is a view showing a view point image which is displayed on a display panel according to an exemplary embodiment.

FIG. 5 is a view showing a view point image which is displayed on a display panel according to an exemplary embodiment. Referring to FIG. 5, images of specific view points 301a, 301b are displayed on the display panel 301. The view point image 301a and the view point image 301b are images at the same view point. Images of different view points of a multi-point image for providing a non-glasses 3D image may be displayed between the view point image 301a and the view point image 301b, but only an image of a specific view point is viewed in a specific location. Therefore, the images of the different view points are displayed black for easy understanding.

Figure 6:
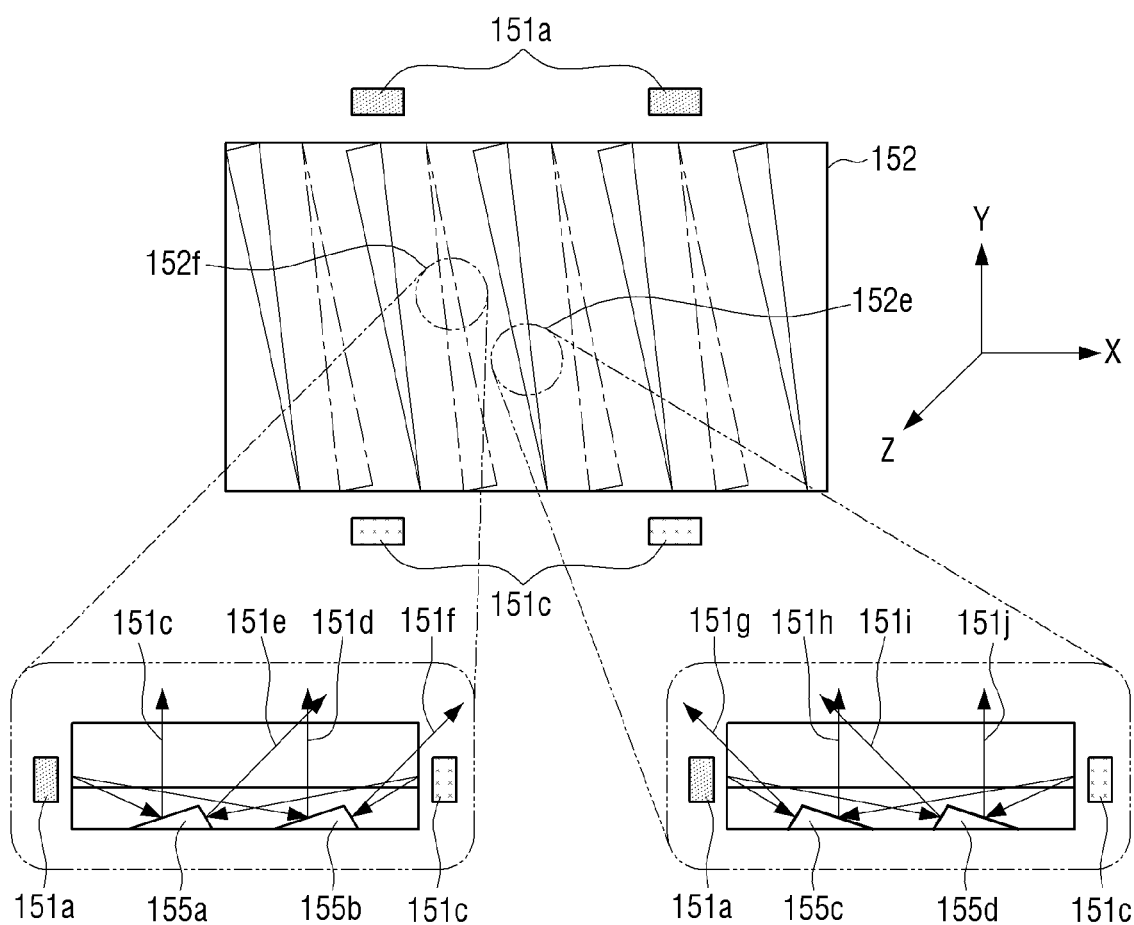
FIG. 6 is a view showing arrangement and operation of a first pattern and a second pattern which are formed in a light guide panel according to an exemplary embodiment.

FIG. 6 is a view to illustrate the arrangement configuration and operation of a first pattern and a second pattern which are formed in a light guide panel according to an exemplary embodiment.

Referring to FIG. 6, a first light source 151a, a second light source 151c, a first pattern 152f, and a second pattern 152e are illustrated.

The first pattern 152f and the second pattern 152e may be alternately formed in the light guide panel 152.

The first light source 151a and the second light source 151c may be disposed to face each other and emit light alternately. That is, when the first light source 151a is turned on, the second light source 151c is turned off, and, when the first light source 151a is turned off, the second light source 151c is turned on. The first pattern 152f responds to the first light source. The responding to a specific light source means that light of the specific light source is reflected in a direction within a predetermined threshold range, and light of the other light source is reflected in a direction out of the threshold range. For example, the first pattern 152f which responds to the first light source 151a is formed to reflect a part of the light irradiated from the first light source 151a in the direction within the predetermined threshold range with reference to the direction perpendicular to the light guide panel 152, and thus emit the light to the outside of the light guide panel 152, but is formed to reflect the light irradiated from the second light source 151c in the direction out of the threshold range. In addition, the second pattern 152e which responds to the second light source 151c is formed to reflect a part of the light irradiated from the second light source 151c in the direction within the predetermined threshold range with reference to the direction perpendicular to the light guide panel 152, and thus emit the light to the outside of the light guide panel 152, but is formed to reflect the light irradiated from the first light source 151a in the direction out of the threshold range.

The first pattern 152f includes a first surface and a second surface. The first surface may reflect the light irradiated from the first light source 151a in the direction within the predetermined threshold range with reference to the direction perpendicular to the light guide panel 152, and emit the light to the outside of the light guide panel, and the second surface may reflect the light irradiated from the second light source 151c in the direction out of the corresponding threshold range.

The left lower view in FIG. 6 is a view enlarging the cross section of the first pattern according to an exemplary embodiment. That is, this view illustrates the cross section of the first pattern cut in the y-axis direction. The first patterns 155a, 155b are formed on the reflection plane of the light guide panel 152. The cross section of the first patterns 155a, 155b may be a bilaterally asymmetrical triangle. That is, the side of the triangle facing the first light source 151a is longer than the side of the triangle facing the second light source 151c. Accordingly, the light 151c, 151d irradiated from the first light source is reflected by the first patterns 155a, 155b in the direction within the predetermined threshold range and thus is emitted to the outside of the light guide panel. However, the light 151e, 151f irradiated from the second light source 151c is reflected by the first patterns 155a, 155b in the direction out of the corresponding threshold range and thus is not emitted to the outside of the light guide panel.

In addition, the second pattern 152e includes a first surface and a second surface. The first surface may reflect the light irradiated from the second light source 151c in the direction within the predetermined threshold range, and emit the light to the outside of the light guide panel, and the second surface may reflect the light irradiated from the first light source 151a in the direction out of the corresponding threshold range.

The right lower view in FIG. 6 is a view enlarging the cross section of the second pattern. That is, this view illustrates the cross section of the second pattern cut in the y-axis direction. The second patterns 155c, 155d are formed on the reflection plane of the light guide panel 152. The cross section of the second patterns 155c, 155d may be a bilaterally asymmetrical triangle. That is, the side of the triangle facing the second light source 151c is longer than the side of the triangle facing the first light source 151a. Accordingly, the light 151h, 151j irradiated from the second light source 151c is reflected by the second patterns 155c, 155d in the direction within the predetermined threshold range with reference to the light guide panel 152 and thus is emitted to the outside of the light guide panel 152. However, the light irradiated from the first light source 151a is reflected by the second patterns 155c, 155d in the direction out of the corresponding threshold range and thus is not emitted to the outside of the light guide panel 152.

The 3D image display apparatus according to an exemplary embodiment allows the first light source and the second light source to emit light serially with respect to images of a same view point, and displays the images on the display panel to enhance resolution when displaying a 3D image. That is, the 3D image display apparatus may display an image of a specific view point on the display panel based on the light emitted from the first light source, and display an image of the same view point once more based on the light emitted from the second light source. The 3D image display apparatus may display a 3D image of a same view point at an even number time once, and display a 3D image once more at an odd number time, thereby increasing the resolution of the images of the same view point by two times. The odd number time and the even number time are used to distinguish temporal orders for convenience of explanation, and the present disclosure is not limited to this.

The 3D image display apparatus turns on the first light source and turns off the second light source at the even number time. Accordingly, only the even-numbered lines on the display panel corresponding to the first pattern, which responds only to the first light source, emit light, such that view point images corresponding to the even-numbered lines are displayed on the display panel. For example, only the $2^{nd}$, $4^{th}$, $6^{th}$, and $8^{th}$ lines emit light and view point images corresponding to these lines are displayed on the display panel.

The 3D image display apparatus turns on the second light source and turns off the first light source at the odd number time. Accordingly, only the odd-numbered lines corresponding to the second pattern, which responds only to the second light source, emit light, such that view point images of the odd-numbered lines are displayed on the display panel. For example, only the 1st, 3rd, 5th, and 7th lines emit light and view point images corresponding to these lines are displayed on the display panel. In this way, the images of the same view point are alternately displayed in the even-numbered lines and the odd-numbered lines, so that the resolution can be increased by two times.

Figure 7:
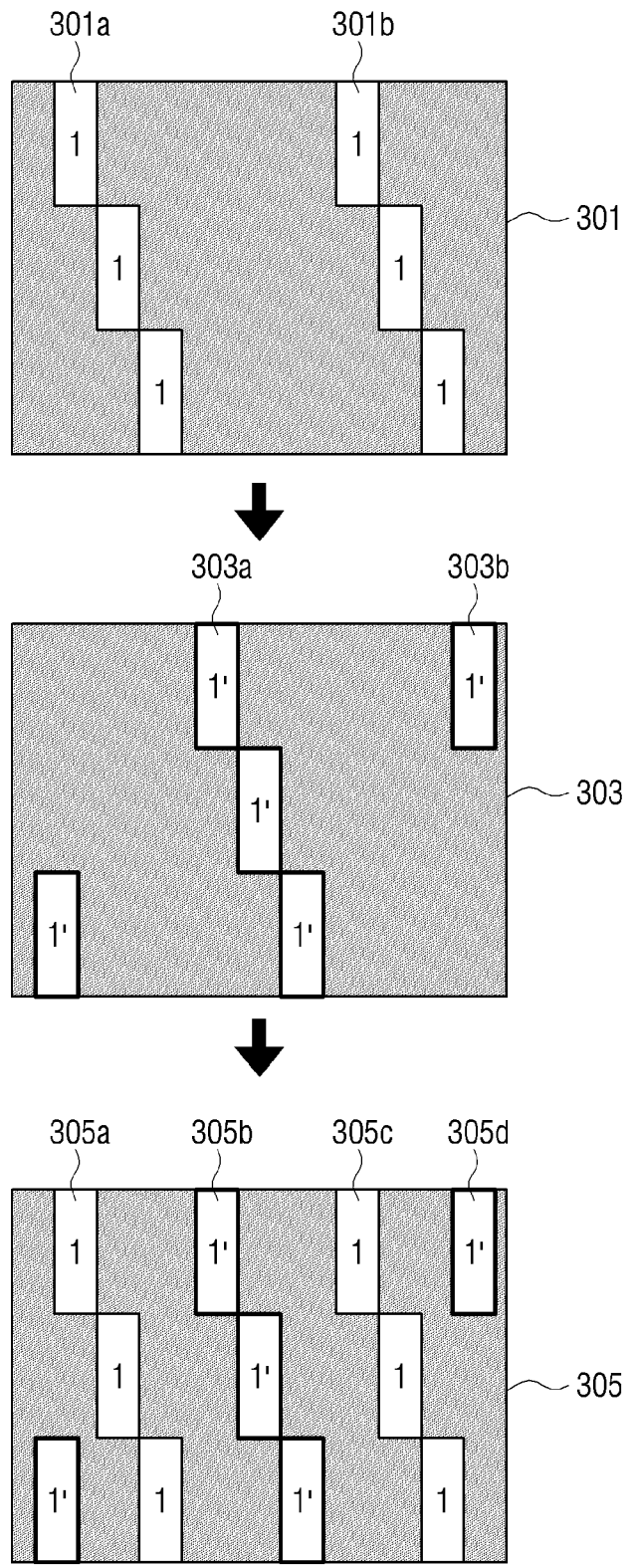
FIG. 7 is a view showing a view point image which is displayed on a display panel by a first pattern and a second pattern formed in a light guide panel according to an exemplary embodiment.

FIG. 7 is a view showing view point images which are displayed on the display panel by the first pattern and the second pattern formed in the light guide panel according to an exemplary embodiment.

Referring to FIG. 7, when the first light source is turned on and the second light source is turned off, a first screen 301 including view point images 301a, 301b corresponding to the first pattern is displayed on the display panel. Herein, the view point image 301a and the view point image 301b are images of a same view point. Because images of different view points may be displayed between the view point image 301a and the view point image 301b, and only an image of a specific view point is viewed in a specific location, the images of the different view points are displayed black for easy understanding. Next, when the first light source is turned off and the second light source is turned on, a second screen 303 including view point images 303a, 303b corresponding to the second pattern is displayed on the display panel. Herein, the view point image 303a and the view point image 303b are images of a same view point. In addition, the view point images 303a, 303b included in the second screen 303 and the view point images 301a, 301b included in the first screen 301 are images of the same view point. Because an interval at which the first screen 301 and the second screen 303 displayed on the display panel are converted is shorter than a time of an afterimage of eyes, the screen that the user actually feels may be a third screen 305 in which the first screen 301 and the second screen 303 overlap each other. The user may feel as if the images 301a, 301b corresponding to the first pattern and the images 303a, 303b corresponding to the second pattern are displayed in the third screen 305 simultaneously due to the afterimage effect, and thus the resolution increases.

Figure 8:
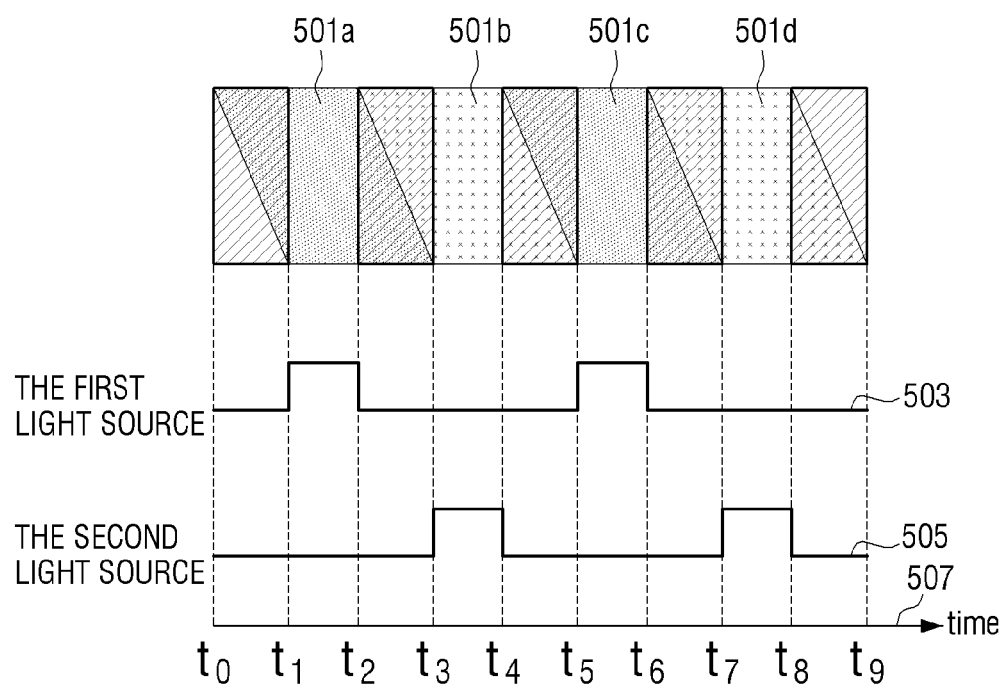
FIG. 8 is a view showing a timing chart for driving a first light source and a second light source according to an exemplary embodiment.

FIG. 8 is a view showing a timing chart for driving the first light source and the second light source according to an exemplary embodiment.

Referring to FIG. 8, image frames 501a, 501b, 501c, and 501d displayed on the screen at time intervals, a first light source timing chart 503, a second light source timing chart 505, and a time axis 507 are illustrated.

The 3D image according to an exemplary embodiment includes the even-numbered frames 501a, 501c and the odd-numbered frames 501b, 501d to increase the resolution. In the case of an LCD display panel, an image is formed on a line basis due to the characteristic of the LCD display panel and thus the first line and the last line for configuring an image are displayed at a different time. In addition, the even-numbered frame and the odd-numbered frame are displayed at a different time. For example, the first line of the even-numbered frame 501a may be displayed on the screen during time t0-t2 and the last line of the even-numbered frame 501a may be displayed on the screen during time t1-t3. In addition, the first line of the odd-numbered frame 501b may be displayed on the screen during time t2-t4, and the last line of the odd-numbered frame 501b may be displayed on the screen during time t3-t5. That is, the even-numbered frame 501a may be displayed on the screen during time t0-t3, and the odd-numbered frame 501b may be displayed the screen during time t2-t5. Therefore, because the odd-numbered frame 501b is displayed on the screen before the even-numbered frame 501a disappears from the screen, there may be time t2-t3 during which the even-numbered frame 501a and the odd-numbered frame 501b are displayed on the screen simultaneously.

The first line of the odd-numbered frame 501b may be displayed on the screen during time t2-t4 and the last line of the odd-numbered frame 501b may be displayed on the screen during time t3-t5. The first line of the even-numbered frame 501c may be displayed on the screen during time t4-t6, and the last line of the even-numbered frame 501c may be displayed on the screen during time t5-t7. That is, the odd-numbered frame 501b may be displayed on the screen during time t2-t5, and the even-numbered frame 501c may be displayed on the screen during time t4-t7. Therefore, because the even-numbered frame 501c is displayed on the screen before the odd-numbered frame 501b disappears from the screen, there may be time t4-t5 during which the odd-numbered frame 501b and the even-numbered frame 501c are displayed on the screen simultaneously.

In addition, the first line of the even-numbered frame 501c may be displayed on the screen during time t4-t6 and the last line of the even-numbered frame 501c may be displayed on the screen during time t5-t7. The first line of the odd-numbered frame 501d may be displayed on the screen during time t6-t8, and the last line of the odd-numbered frame 501d may be displayed on the screen during time t7-t9. That is, the even-numbered frame 501c may be displayed on the screen during time t4-t7, and the odd-numbered frame 501d may be displayed on the screen during time t6-t9. Therefore, because the odd-numbered frame 501d is displayed on the screen before the even-numbered frame 501c disappears from the screen, there may be time t6-t7 during which the even-numbered frame 501c and the odd-numbered frame 501d are displayed on the screen simultaneously.

The even-numbered frame and the odd-numbered frame may be turned off in time intervals t041, t2-t3, t4-t5, t6-t7, t8-t9 during which the even-numbered frame and the odd-numbered frame are displayed on the screen simultaneously. In addition, the screen may be turned on in time intervals t1-t2 and t5-t6 during which only the even-numbered frames are displayed, and in time intervals t3-t4 and t7-t8 during which only the odd-numbered frames are displayed. The screen is turned on or off by turning on or off the first light source or the second light source.

When the first light source is turned on, the even-numbered frames 501a, 501c are displayed on the screen, and, when the second light source is turned on, the odd-numbered frames 501b, 501d are displayed on the screen. Accordingly, the first light source 503 may be turned on in time intervals t1-t2 and t5-t6 during which only the even-numbered frames 501a, 501c are displayed, and is turned off in the other intervals. The second light source 505 may be turned on in time intervals t3-t4 and t7-t8 during which only the odd-numbered frames 501b, 501d are displayed, and is turned off in the other intervals.

Figure 9:
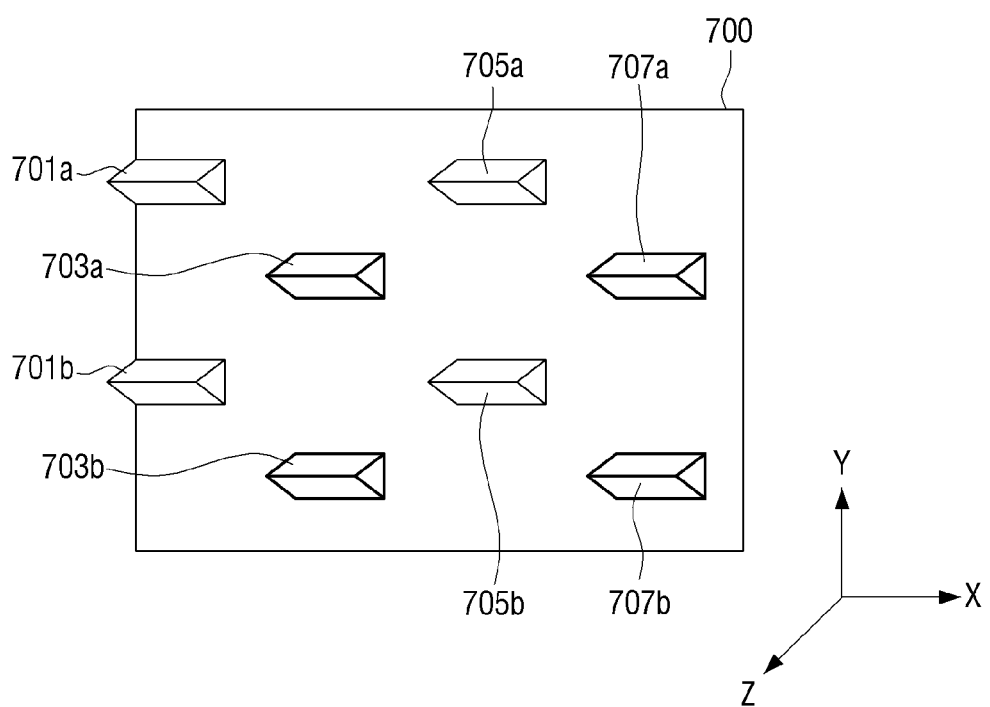
FIG. 9 is a view showing a part of a first pattern and a second pattern which are formed in a light guide panel according to an exemplary embodiment.

FIG. 9 is a view showing parts of a first pattern and a second pattern which are formed in a light guide panel according to an exemplary embodiment.

Referring to FIG. 9, a light guide panel 700 which includes first patterns 701a, 701b, 705a, 705b, and second patterns 703a, 703b, 707a, 707b is illustrated. The first patterns 701a, 701b, 705a, 705b may respond only to the first light source. That is, the first patterns 701a, 701b, 705a, 705b may reflect the light irradiated from the first light source in a direction within a predetermined threshold range with reference to a direction perpendicular to the light guide panel 700, but reflect the light irradiated from the second light source in a direction out of the corresponding threshold range. The second patterns 703a, 703b, 707a, 707b may respond only to the second light source. That is, the second patterns 703a, 703b, 707a, 707b reflect the light irradiated from the second light source in the direction within the predetermined threshold range with reference to the direction perpendicular to the light guide panel 700, but reflect the light irradiated from the first light source in the direction out of the corresponding threshold range.

The first patterns 701a, 701b, 705a, 705b and the second patterns 703a, 703b, 707a, 707b may be formed alternately in a grid pattern. That is, from the perspective of the cross section of the light guide panel in the x-axis direction, the patterns are arranged in order of the first patterns 705a, 701a, the second patterns 707a, 703a, the first patterns 705b, 701b, and the second patterns 707b, 703b. From the perspective of the cross section of the light guide panel in the y-axis direction, the patterns are arranged in order of the first patterns 701a, 701b, the second patterns 703a, 703b, the first patterns 705a, 705b, and the second patterns 707a, 707b.

In addition, sub patterns constituting the first pattern and the second pattern may be formed at regular intervals in the x-axis and y-axis directions. For example, the first sub pattern 701a constituting the first pattern and the second sub pattern 703a constituting the second pattern may be distanced from each other by 250 um in the x-axis direction and by 20 um in the y-axis direction. In addition, the size of the sub pattern constituting the first pattern and the second pattern may be determined according to the display panel. For example, the first sub pattern 701a and the second sub pattern 703a may be 50 um by 20 um.

Figure 10:
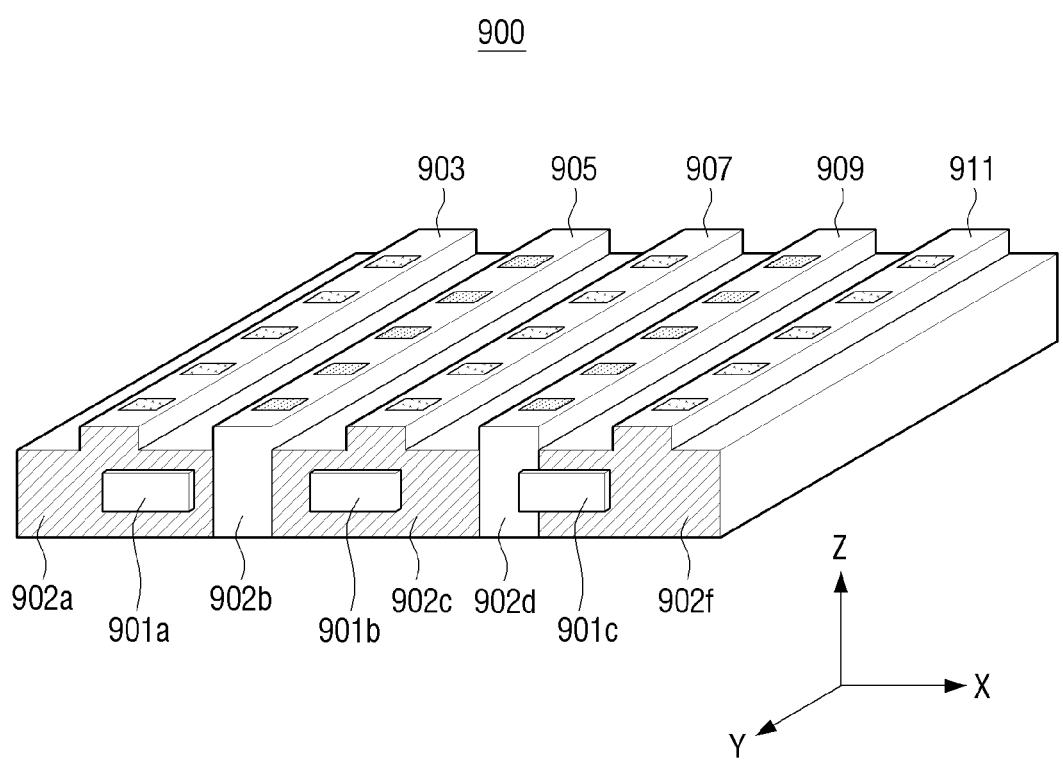
FIG. 10 is a view showing a configuration of a light guide panel according to another exemplary embodiment.

FIG. 10 is a view showing a configuration of a light guide panel according to another exemplary embodiment. As shown in FIG. 10, a protrusion and a depression may be formed alternately on the light guide panel, and a first pattern and a second pattern may be formed in the protrusion.

Referring to FIG. 10, protrusions 903, 905, 907, 909, 911 may be formed on the reflection plane of the light guide panel 900. Depressions may be formed between the protrusions. The protrusions 903, 905, 907, 909, 911 formed on the reflection plane of the light guide panel 900 may facilitate the traveling of light. In addition, the protrusions 903, 905, 907, 909, 911 may have a first pattern and a second pattern formed therein.

Mask patterns 902a, 902c, 902f may be formed on the incidence plane of the light guide panel 900 to allow the light irradiated from first light sources 901a, 901b, 901c to be transmitted only to the protrusions 905, 909 in which the first pattern is formed. The mask patterns 902a, 902c, and 902f block the light irradiated from the first light sources 901a, 901b, 901c and do not allow the light to be transmitted to the protrusions 903, 907, 911 in which the second pattern is formed. The light irradiated from the first light sources 901a, 901b, 901c is transmitted through the incidence planes 902b, 902d where the mask pattern is not formed, and travels to the protrusions 905, 909 in which the first pattern is formed.

Figure 11:
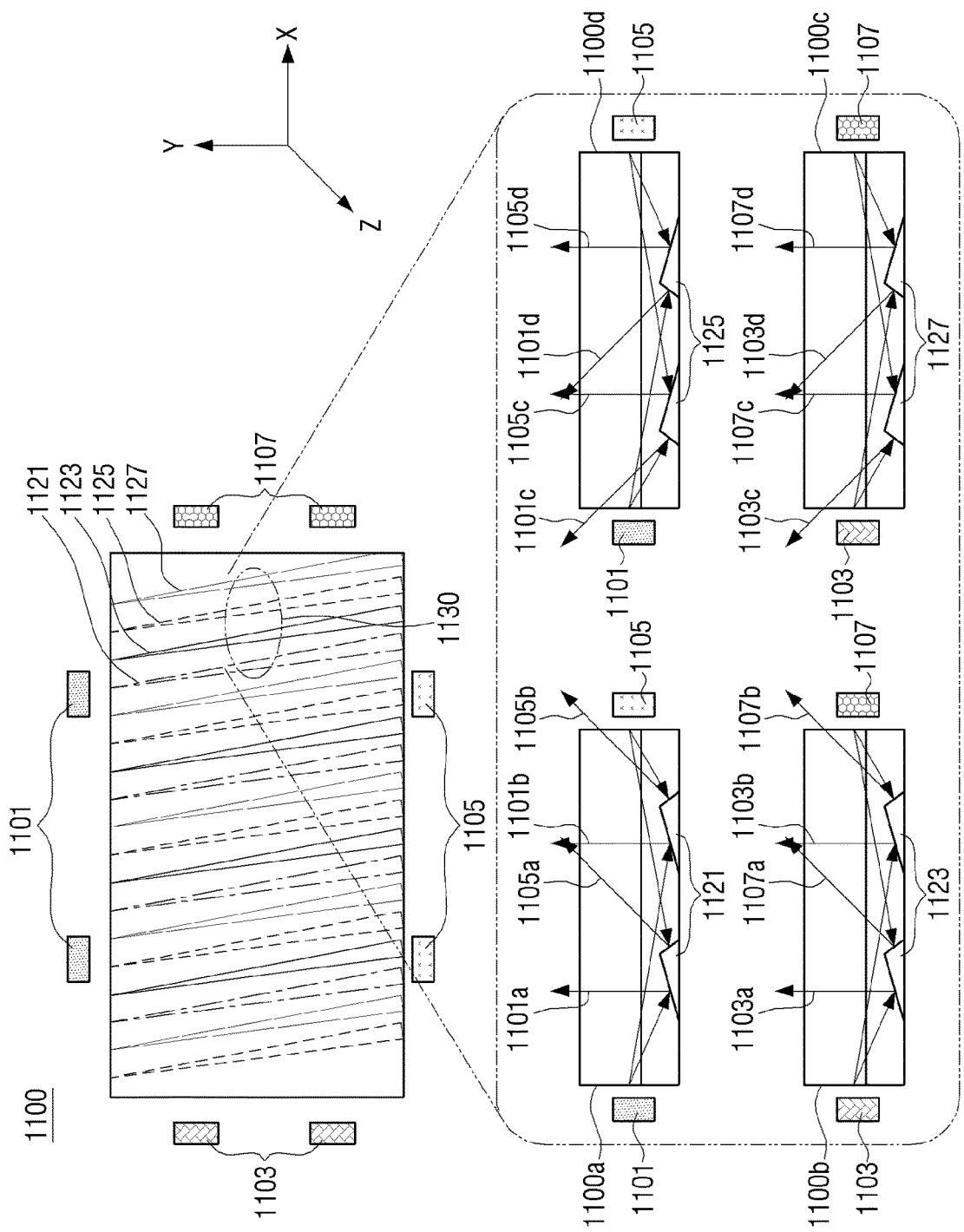
FIG. 11 is a view illustrating a configuration and operation of a light guide panel according to another exemplary embodiment.

FIG. 11 is a view to illustrate a configuration and operation of a light guide panel according to another exemplary embodiment.

Referring to FIG. 11, a first light source 1101, a third light source 1103, a second light source 1105, a fourth light source 1107, a first pattern 1121, a third pattern 1123, a second pattern 1125, and a fourth pattern 1127 are illustrated. The first pattern 1121, the third pattern 1123, the second pattern 1125, and the fourth pattern 1127 are formed on the reflection plane of the light guide panel 1100. The same shape and the same line in the drawing refer to the same pattern. In the light guide panel 1100, the patterns are repeatedly formed in order of the first pattern 1121, the third pattern 1123, the second pattern 1125, the fourth pattern 1127, the first pattern 1121, the third pattern 1123, and so on. The first pattern 1121 may be arranged at 0 degree with reference to the x-axis, the third pattern 1123 may be rotated by 90 degrees with reference to the x-axis, the second pattern 1125 may be rotated by 180 degrees with reference to the x-axis, and the fourth pattern 1127 may be rotated by 270 degrees with reference to the x-axis. That is, each of the first pattern 1121, the third pattern 1123, the second pattern 1125, and the fourth pattern 1127 may be formed to have a difference of 90 degrees from the previous one.

The first light source 1101, the third light source 1103, the second light source 1105, and the fourth light source 1107 are arranged to have a difference of 90 degrees from a neighboring one. That is, the first light source 1101 may be disposed adjacent to a first side of the light guide panel 1100, and the third light source 1103 may be disposed adjacent to a third side of the light guide panel 1100. In addition, the second light source 1105 may be disposed adjacent to a second side of the light guide panel 1100, and the fourth light source 1107 may be disposed adjacent to a fourth side of the light guide panel 1100.

The first pattern 1121 responds only to the first light source 1101, the third pattern 1123 responds only to the third light source 1103, the second pattern 1125 responds only to the second light source 1105, and the fourth pattern 1127 responds only to the fourth light source 1107. Herein, the responding to a light source refers to light from the light source being reflected in a direction within a predetermined threshold range with reference to a direction perpendicular to the light guide panel 1100, and light of the other light sources is reflected in a direction out of the corresponding threshold range.

For example, the first pattern 1121 reflects the light irradiated from the first light source 1101 in a direction within the predetermined threshold range, and reflects the light irradiated from the third light source 1103, the second light source 1105, and the fourth light source 1107 in a direction out of the corresponding threshold range. The third pattern 1123 reflects the light irradiated from the third light source 1103 in a direction within the predetermined threshold range, and reflects the light irradiated from the first light source 1101, the second light source 1105, and the fourth light source 1107 in a direction out of the corresponding threshold range. The second pattern 1125 reflects the light irradiated from the second light source 1105 in a direction within the predetermined threshold range, and reflects the light irradiated from the first light source 1101, the third light source 1103, and the fourth light source 1107 in a direction out of the corresponding threshold range. The fourth pattern 1127 reflects the light irradiated from the fourth light source 1107 in a direction within the predetermined threshold range, and reflects the light irradiated from the first light source 1101, the third light source 1103, and the second light source 1105 in a direction out of the corresponding threshold range.

The lower view in FIG. 11 is a view enlarging the part illustrated by the dotted line 1130.

Reference numeral 1100a indicates a cross section of the light guide panel 1100 cut in the x-axis direction. The first pattern 1121 is formed on the reflection plane of the light guide panel 1100. The first pattern 1121 reflects light 1101a, 1101b irradiated from the first light source 1101 in a direction within the predetermined threshold range with reference to the direction perpendicular to the light guide panel 1100, and reflects light 1105a, 1105b irradiated from the second light source 1105 in a direction out of the corresponding threshold range. In addition, the first pattern 1121 reflects light irradiated from the third light source 1103 and the fourth light source 1107 in a direction out of the corresponding threshold range. The light 1101a, 1101b reflected in the direction within the predetermined threshold range may be emitted to the outside of the light guide panel 1100.

Reference numeral 1100b indicates a cross section of the light guide panel 1100 cut in the y-axis direction. The third pattern 1123 is formed on the reflection plane of the light guide panel 1100b. The third pattern 1123 reflects light 1103a, 1103b irradiated from the third light source 1103 in a direction within the predetermined threshold range with reference to the direction perpendicular to the light guide panel 1100, and reflects light 1107a, 1107b irradiated from the fourth light source 1107 in a direction out of the corresponding threshold range. In addition, the third pattern 1123 reflects light irradiated from the first light source 1101 and the second light source 1105 in a direction out of the corresponding threshold range. The light reflected in the direction within the predetermined threshold range may be emitted to the outside of the light guide panel (in the z-axis direction).

Reference numeral 1100c indicates a cross section of the light guide panel 1100 cut in the y-axis direction. The fourth pattern 1127 is formed on the reflection plane of the light guide panel 1100c. The fourth pattern 1127 reflects light 1107c, 1107d irradiated from the fourth light source 1107 in a direction within the predetermined threshold range with reference to the direction perpendicular to the light guide panel 1100, and reflects light 1103c, 1103d irradiated from the third light source 1103 in a direction out of the corresponding threshold range. In addition, the fourth pattern 1127 reflects light irradiated from the first light source 1101 and the second light source 1105 in a direction out of the corresponding threshold range. The light reflected in the direction within the predetermined threshold range may be emitted to the outside of the light guide panel (in the z-axis direction).

Reference numeral 1100d indicates a cross section of the light guide panel 1100 cut in the x-axis direction. The second pattern 1125 is formed on the reflection plane of the light guide panel 1100d. The second pattern 1125 reflects light 1105c, 1105d irradiated from the second light source 1105 in a direction within the predetermined threshold range with reference to the direction perpendicular to the light guide panel 1100, and reflects light 1101c, 1101d irradiated from the first light source 1101 in a direction out of the corresponding threshold range. In addition, the second pattern 1125 reflects light irradiated from the third light source 1103 and the fourth light source 1107 in a direction out of the corresponding threshold range. The light 1105c, 1105d reflected in the direction within the predetermined threshold range may be emitted to the outside of the light guide panel (in the z-axis direction).

The first light source 1101, the third light source 1103, the second light source 1105, and the fourth light source 1107 emit light serially. That is, the light sources emit light in order of the first light source 1101, the third light source 1103, the second light source 1105, the fourth light source 1107, the first light source 1101, and so on. The four light sources emit the light serially, so that the same effect as four linear light sources emitting light serially through the first pattern 1121, the third pattern 1123, the second pattern 1125, and the fourth pattern 1127 corresponding to the respective light sources can be achieved.

As the four linear light sources emit the light serially, the resolution of the 3D image displayed on the display panel increases by four times.

Figure 12:
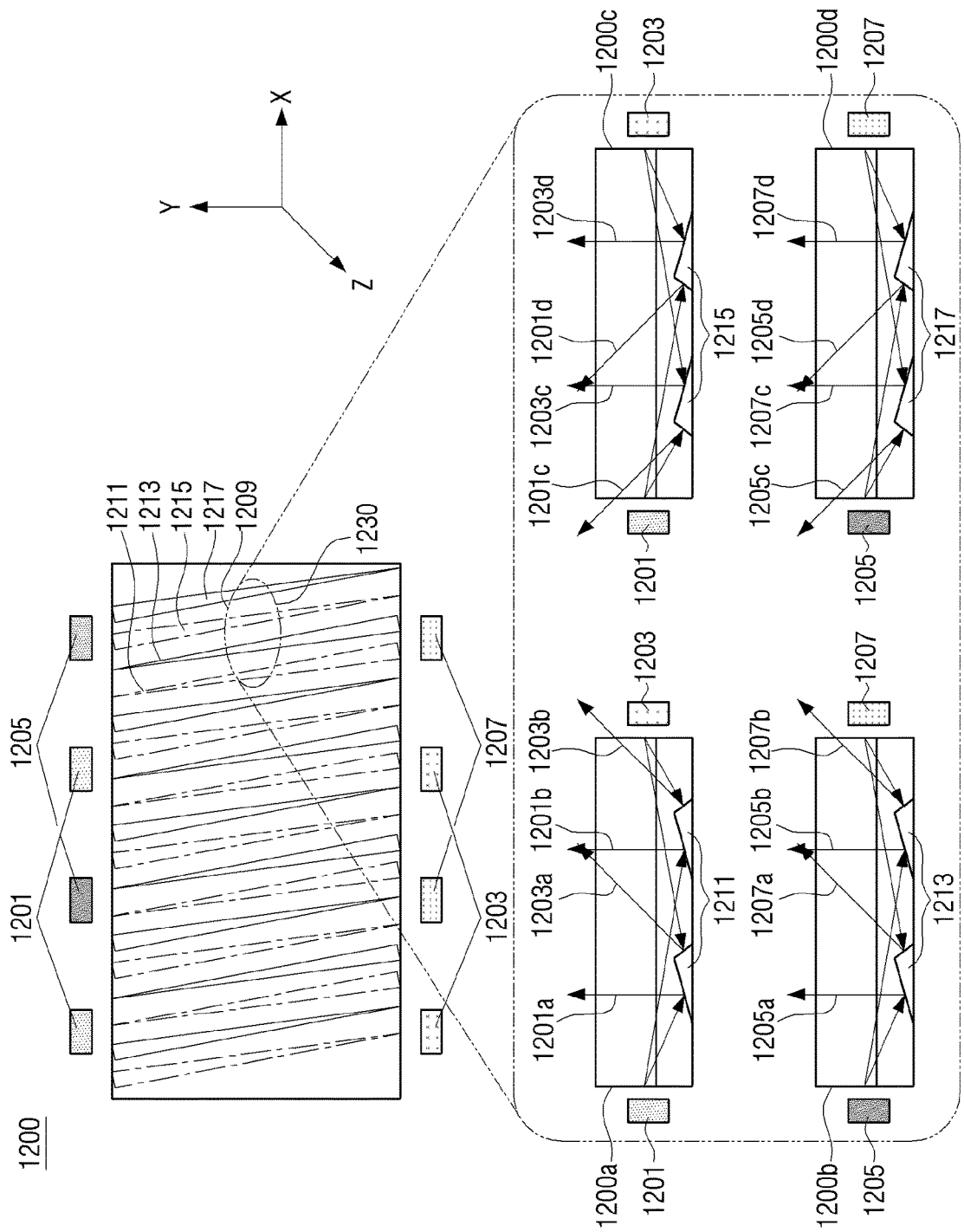
FIG. 12 is a view illustrating a configuration and operation of a light guide panel according to another exemplary embodiment.

FIG. 12 is a view to illustrate a configuration and operation of a light guide panel according to another exemplary embodiment.

Referring to FIG. 12, a first light source 1201, a second light source 1205, a third light source 1203, a fourth light source 1207, a first pattern 1211, a second pattern 1213, a third pattern 1215, and a fourth pattern 1217 are illustrated. The first pattern 1211, the second pattern 1213, the third pattern 1215, and the fourth pattern 1217 are formed on the reflection plane of the light guide panel 1200. The same shape and the same line in the drawing refer to the same pattern.

In the light guide panel 1200, the patterns are repeatedly formed in order of the first pattern 1211, the second pattern 1213, the third pattern 1215, the fourth pattern 1217, the first pattern 1211, the second pattern 1213, and so on.

The first light source 1201 and the third light source 1203 may irradiate light of a first wavelength. The second light source 1205 and the fourth light source 1207 may irradiate light of a second wavelength.

The first pattern 1211 responds only to the first light source 1201, the second pattern 1213 responds only to the second light source 1205, the third pattern 1215 responds only to the third light source 1203, and the fourth pattern 1217 responds only to the fourth light source 1207. In addition, the first pattern 1211 and the third pattern 1215 respond only to the light of the first wavelength, and the second pattern 1213 and the fourth pattern 1217 respond only to the light of the second wavelength.

Responding to a specific light source or light of a specific wavelength means that light irradiated from the specific light source and the light of the specific wavelength are reflected in a direction within a predetermined threshold range with reference to a direction perpendicular to the light guide panel 1200, and light of the other light sources and light of the other wavelengths are reflected in a direction out of the corresponding threshold range.

For example, the first pattern 1211 reflects the light irradiated from the first light source 1201 in a direction within the predetermined threshold range with reference to the direction perpendicular to the light guide panel 1200, and reflects the light irradiated from the second light source 1205, the third light source 1203, and the fourth light source 1207 in a direction out of the corresponding threshold range. The second pattern 1213 reflects the light irradiated from the second light source 1205 in a direction within the predetermined threshold range with reference to the direction perpendicular to the light guide panel 1200, and reflects the light irradiated from the first light source 1201, the third light source 1203, and the fourth light source 1207 in a direction out of the corresponding threshold range. The third pattern 1215 reflects the light irradiated from the third light source 1203 in a direction within the predetermined threshold range with reference to the direction perpendicular to the light guide panel 1200, and reflects the light irradiated from the first light source 1201, the second light source 1205, and the fourth light source 1207 in a direction out of the corresponding threshold range. The fourth pattern 1217 reflects the light irradiated from the fourth light source 1207 in a direction within the predetermined threshold range with reference to the direction perpendicular to the light guide panel 1200, and reflects the light irradiated from the first light source 1201, the second light source 1205, and the third light source 1203 in a direction out of the corresponding threshold range.

The lower view in FIG. 12 is a view enlarging the part illustrated by the dotted line 1230.

Reference numeral 1200*a* indicates a cross section of the light guide panel 1200 cut in the x-axis direction. The first pattern 1211 is formed on the reflection plane of the light guide panel 1200*a*. The first pattern 1211 reflects light 1201*a*, 1201*b* irradiated from the first light source 1201 in a direction within the predetermined threshold range with reference to the direction perpendicular to the light guide panel 1200, and reflects light 1203*a*, 1203*b* irradiated from the third light source 1203 in a direction out of the corresponding threshold range. In addition, the first pattern 1211 reflects light irradiated from the second light source 1205 and the fourth light source 1207 in a direction out of the corresponding threshold range. The light 1201*a*, 1201*b* reflected in the direction within the predetermined threshold range may be emitted to the outside of the light guide panel 1200*a*. Because the first pattern 1211 and the second pattern 1213 are arranged in the same direction, but respond only to the light of different wavelengths, the second pattern 1213 does not respond to the light from the first light source 1201. That is, the second pattern 1213 does not respond to the light of the first wavelength.

Reference numeral 1200*b* indicates a cross section of the light guide panel 1200 cut in the x-axis direction. The second pattern 1213 is formed on the reflection plane of the light guide panel 1200*b*. The second pattern 1213 reflects light 1205*a*, 1205*b* irradiated from the second light source 1205 in a direction within the predetermined threshold range with reference to the direction perpendicular to the light guide panel 1200, and reflects light 1207*a*, 1207*b* irradiated from the fourth light source 1207 in a direction out of the corresponding threshold range. In addition, the second pattern 1213 reflects light irradiated from the first light source 1201 and the third light source 1203 in a direction out of the corresponding threshold range. The light 1205*a*, 1205*b* reflected in the direction within the predetermined threshold range may be emitted to the outside of the light guide panel 1200*b*. Because the first pattern 1211 and the second pattern 1213 are arranged in the same direction, but respond only to the light of different wavelengths, the first pattern 1211 does not respond to the light from the second light source 1205. That is, the first pattern 1211 does not respond to the light of the second wavelength.

Reference numeral 1200*c* indicates a cross section of the light guide panel 1200 cut in the x-axis direction. The third pattern 1215 is formed on the reflection plane of the light guide panel 1200. The third pattern 1215 reflects light 1203*c*, 1203*d* irradiated from the third light source 1203 in a direction within the predetermined threshold range with reference to the direction perpendicular to the light guide panel 1200, and reflects light 1201*c*, 1201*d* irradiated from the first light source 1201 in a direction out of the corresponding threshold range. In addition, the third pattern 1215 reflects light irradiated from the second light source 1205 and the fourth light source 1207 in a direction out of the corresponding threshold range. The light 1203*c*, 1203*d* reflected in the direction within the predetermined threshold range may be emitted to the outside of the light guide panel 1200*c*. Because the third pattern 1215 and the fourth 1217 are arranged in the same direction, but respond only to the light of different wavelengths, the fourth pattern 1217 does not respond to the light from the third light source 1203. That is, the fourth pattern 1217 does not respond to the light of the first wavelength.

Reference numeral 1200*d* indicates a cross section of the light guide panel 1200 cut in the x-axis direction. The fourth pattern 1217 is formed on the reflection plane of the light guide panel 1200*d*. The fourth pattern 1217 reflects light 1207*c*, 1207*d* irradiated from the fourth light source 1207 in a direction within the predetermined threshold range with reference to the direction perpendicular to the light guide panel 1200, and reflects light 1205*c*, 1205*d* irradiated from the second light source 1205 in a direction out of the corresponding threshold range. In addition, the fourth pattern 1217 reflects light irradiated from the first light source 1201 and the third light source 1203 in a direction out of the corresponding threshold range. The light 1207*c*, 1207*d* reflected in the direction within the predetermined threshold range may be emitted to the outside of the light guide panel 1200*d*. Because the third pattern 1215 and the fourth 1217 are arranged in the same direction, but respond only to the light of different wavelengths, the third pattern 1215 does not respond to the light from the fourth light source 1207. That is, the third pattern 1215 does not respond to the light of the second wavelength.

The first light source 1201, the second light source 1205, the third light source 1203, and the fourth light source 1207 emit light serially. That is, the light sources emit light in order of the first light source 1201, the second light source 1205, the third light source 1203, the fourth light source 1207, the first light source 1201, the second light source 1205, and so on. The four light sources emit the light serially, so that the same effect as four linear light sources emitting light serially through the first pattern 1211, the second pattern 1213, the third pattern 1215, and the fourth pattern 1217 corresponding to the respective light sources can be achieved.

As the four linear light sources emit the light serially, the resolution of the 3D image displayed on the display panel increases by four times.

Figure 13:
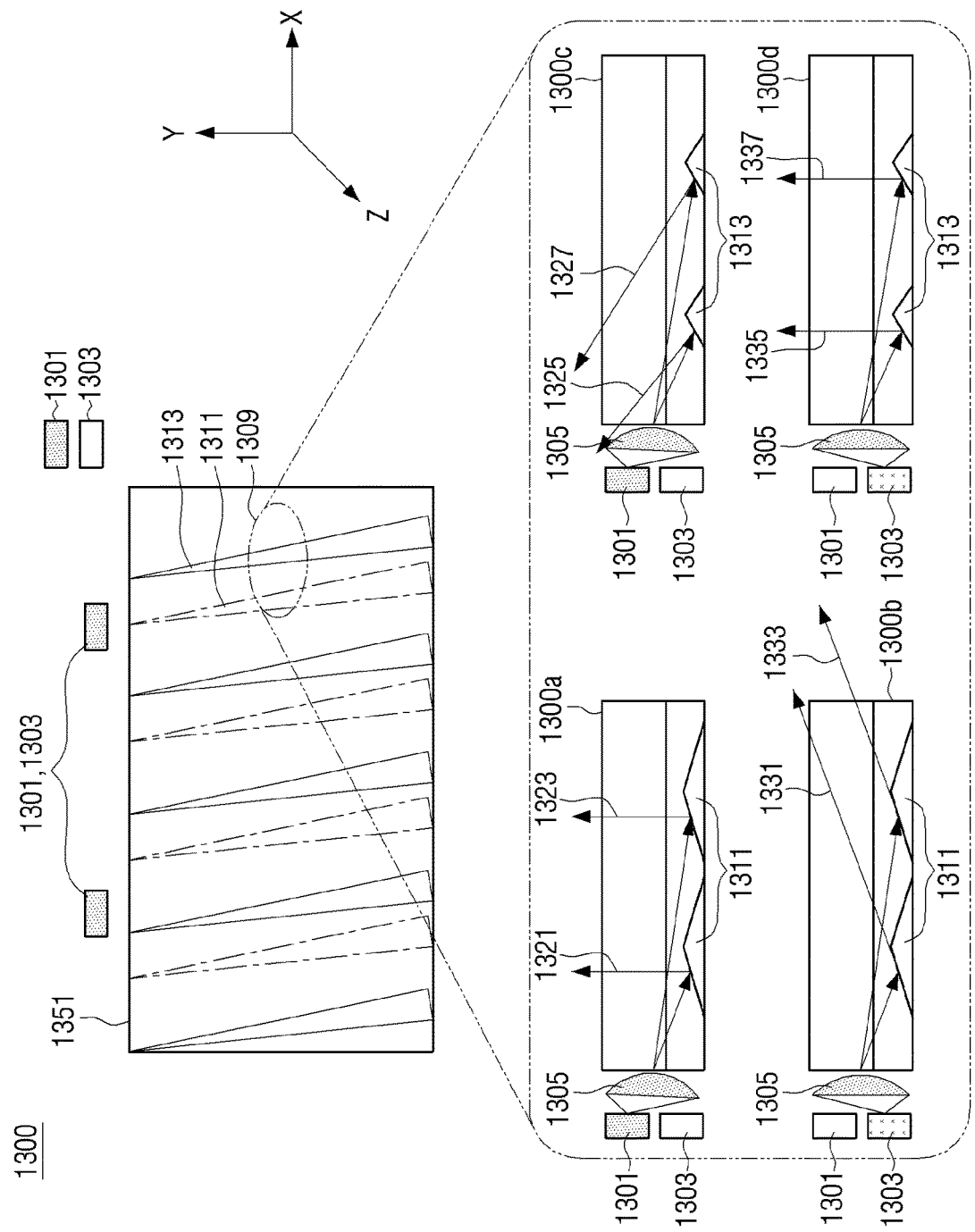
FIG. 13 is a view illustrating a configuration and operation of a light guide panel according to another exemplary embodiment.

FIG. 13 is a view to illustrate a configuration and operation of a light guide panel according to another exemplary embodiment.

Referring to FIG. 13, a first light source 1301 and a second light source 1303 are arranged on a first incidence plane 1351 of the light guide panel 1300. The first light source 1301 and the second light source 1303 may be disposed adjacent to a first side of the light guide panel 1300.

The first light source 1301 is arranged on the upper end and the second light source 1303 is arranged on the lower end when the first light source 1301 and the second light source 1303 are viewed in the y-axis direction.

A first pattern 1311 and a second pattern 1313 are formed on the reflection plane of the light guide panel 1300. The same shape and the same line in the drawing refers to the same pattern. The first pattern 1311 and the second pattern 1313 are repeatedly formed in the light guide panel 1300. The cross section of the first pattern 1311 and the cross section of the second pattern 1313 may be different from each other. Because the first light source 1301 and the second light source 1303 are arranged on the same incidence plane, the first pattern 1311 may respond to the first light source 1301, but may not respond to the second light source 1303. Likewise, the second pattern 1313 may respond to the second light source 1303, but may not respond to the first light source 1301. Herein, the responding to a light source refers to light irradiated from the light source being reflected in a direction within a predetermined threshold range with reference to a direction perpendicular to the light guide panel 1300, and light of the other light sources is reflected in a direction out of the corresponding threshold range. That is, the first pattern 1311 reflects the light irradiated from the first light source in a direction within the predetermined threshold range with reference to the direction perpendicular to the light guide panel 1300, and reflects the light irradiated from the second light source 1303 in a direction out of the corresponding threshold range. The second pattern 1313 responds to the second light source 1303 and does not respond to the first light source 1301. That is, the second pattern 1313 reflects the light irradiated from the second light source 1303 in the direction perpendicular to the light guide panel, and reflects the light irradiated from the first light source 1301 in a direction other than the direction perpendicular to the light guide panel. The first light source 1301 and the second light source 1303 do not emit light simultaneously and emit light serially.

The lower view in FIG. 13 is a view enlarging the part illustrated by the dotted line 1309.

Reference numeral 1300*a* indicates a cross section of the light guide panel 1300 cut in the x-axis direction, and illustrates a part of the first pattern. Reference numeral 1300*c* indicates a cross section of the light guide panel 1300 cut in the x-axis direction, and illustrates a part of the second pattern. The first pattern reflects the light 1321, 1323 irradiated from the first light source in a direction within the predetermined threshold range with reference to the direction perpendicular to the light guide panel 1300. The second pattern reflects the light 1325, 1327 irradiated from the first light source in a direction out of the corresponding threshold range.

The first light source and the second light source are arranged on the same incidence plane. The first light source is arranged on the upper end and the second light source is arranged on the lower end. The second light source is turned off while the first light source is turned on. When the first light source is turned on and emits light, the light irradiated from the first light source passes through a collimator lens 1305 and is irradiated toward the light guide panel 1300*a*, 1300*c*, and is reflected by the first pattern in a direction within the predetermined threshold range with reference to the direction perpendicular to the light guide panel 1300 and is emitted to the outside of the light guide panel 1300*a*, and is reflected by the second pattern in a direction out of the corresponding threshold range in the light guide panel 1300*c*.

Reference numeral 1300*b* indicates a cross section of the light guide panel 1300 cut in the x-axis direction, and illustrates a part of the first pattern. Reference numeral 1300*d* indicates a cross section of the light guide panel 1300 cut in the x-axis direction, and illustrates a part of the second pattern. The first pattern reflects the light 1331, 1333 irradiated from the second light source in a direction out of the predetermined threshold range with reference to the direction perpendicular to the light guide panel 1300. The second pattern reflects the light 1335, 1337 irradiated from the second light source in a direction within the corresponding threshold range.

The first light source and the second light source are arranged on the same incidence plane. The first light source is arranged on the upper end and the second light source is arranged on the lower end. The first light source is turned off while the second light source is turned on. When the second light source is turned on and emits light, the light irradiated from the second light source passes through the collimator lens 1305 and is irradiated toward the light guide panel 1300*b*, 1300*d*, and is reflected by the second pattern in a direction within the predetermined threshold range with reference to the direction perpendicular to the light guide panel 1300 and is emitted to the outside of the light guide panel 1300*d*, and is reflected by the first pattern in a direction out of the corresponding threshold range in the light guide panel 1300*b*.

That is, when the first light source emits light, the light irradiated from the first light source is emitted to the outside of the light guide panel on a location where the first pattern is formed and is emitted in the form of line light. On the other hand, the light from the first light source is reflected on a location where the second pattern is formed and is not emitted to the outside of the light guide panel.

When the second light source emits light, the light irradiated from the second light source is emitted to the outside of the light guide panel on the location where the second pattern is formed and is emitted in the form of line light. On the other hand, the light from the second light source is reflected on the location where the first pattern is formed and is not emitted to the outside of the light guide panel.

Because the first light source and the second light source emit light serially and the line light is emitted from the location where the first pattern is formed and the location where the second pattern is formed alternately, the 3D image is alternately displayed on a corresponding part of the display panel and thus the resolution increases.

Figure 14:
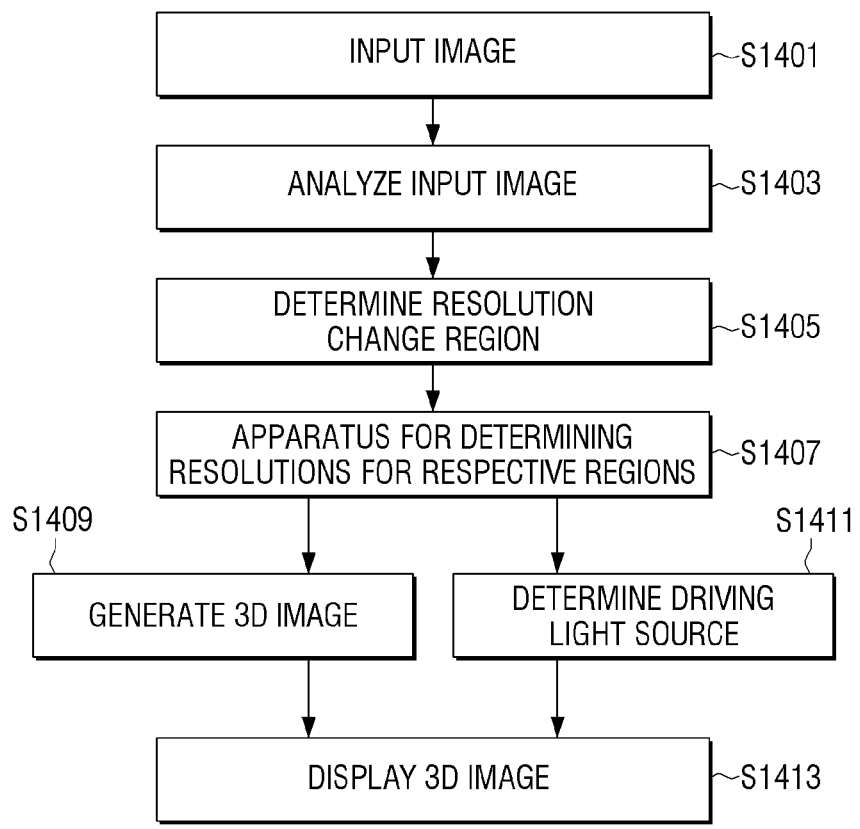
FIG. 14 is a view illustrating a process of generating a 3D image having a different resolution for each region according to another exemplary embodiment.

FIG. 14 is a view showing a process of generating a 3D image having a different resolution for each region according to an exemplary embodiment.

Referring to FIG. 14, an image signal is inputted (S1401). The image signal may include depth value information for generating a 2D image and a 3D image.

The controller may analyze the inputted image signal and determine whether there is a need to increase resolution (S1403). The controller may increase the resolution of the entire image or increase the resolution of only a specific region. The controller may adjust the resolution based on the inputted image signal. For example, when the inputted image signal is a text-based content, the controller may not increase the resolution, and, when the inputted image signal is a movie content, the controller may increase the resolution. The controller may receive a determination on whether to increase the resolution or not from the user, and therefore, the controller may display a User Interface (UI) screen related to the increase of the resolution on the display panel.

The controller may analyze the image signal and determine a resolution change region (S1405). For example, when the entire image is formed of a text and partially includes a photo, the controller may determine a location of a region including the photo and change the resolution regarding the region including the photo.

In response to the resolution change region being determined, the controller may determine resolution for each region (S1407). For example, in response to A and B regions including a photo in the entire screen region being determined, the controller may increase the resolution regarding the A and B regions by two times, and may not change the resolution of the other regions.

In response to the resolution for each region being determined, the controller may generate a 3D image corresponding to the resolution (S1409). In addition, in response to the resolution for each region being determined, the controller may determine a driving light source corresponding to the resolution change region (S1411).

In response to the driving light source being determined, the controller drives a light source and changes the resolution, and controls the display panel to display the 3D image (S1413).

Figure 15:
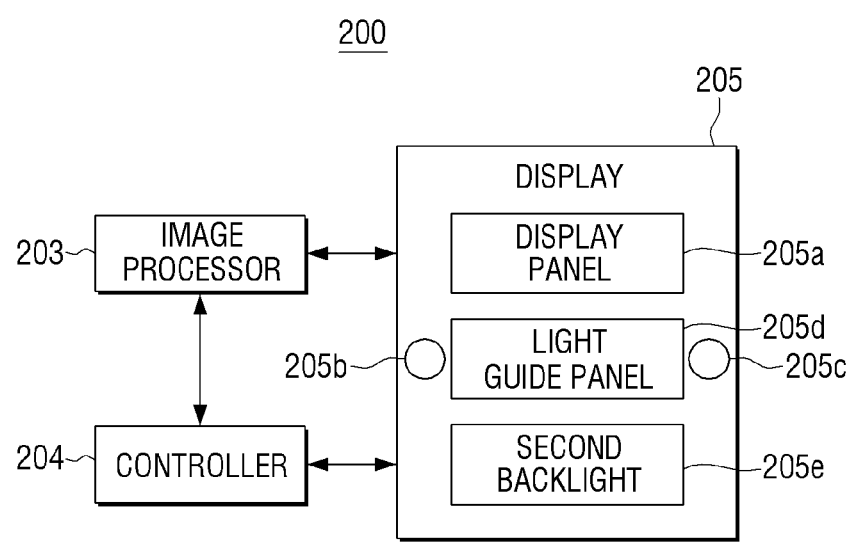
FIG. 15 is a block diagram of a 3D image display apparatus according to an exemplary embodiment.

FIG. 15 is a block diagram of a 3D image display apparatus according to an exemplary embodiment.

Referring to FIG. 15, the 3D image display apparatus 200 may include an image processor 203, a controller 204, and a display 205.

The image processor 203 generates a 3D image signal based on a 2D image signal inputted to the 3D image display apparatus and a depth map corresponding to the 2D image signal. The 3D image signal may be generated with reference to the depth map of the 2D image signal. In addition, the 3D image signal may have a plurality of frames for a same view point image to increase resolution. The number of frames constituting the same view point may be greater than the number of pattern types formed in the light guide panel. For example, when the first pattern and the second pattern are formed in the light guide panel, the number of frames constituting the same view point may be two or more. When the first pattern, the second pattern, the third pattern, and the fourth pattern are formed, the number of frames constituting the same view point may be four or more.

The display 205 may include a display panel 205a, a first light source 205b, a second light source 205c, a light guide panel 205d, and a second backlight 205e. The display panel 205a may display a 3D image. The first light source 205b and the second light source 205c may irradiate light toward the light guide panel.

The light guide panel 205d may be disposed on the rear surface of the display panel 205a to emit light to the display panel 205a. In the light guide panel 205d, a first pattern which responds to the first light source 205b and does not respond to the second light source 205c may be formed, and a second pattern which responds to the second light source 205c and does not respond to the first light source 205b may be formed.

The light irradiated from the first light source 205b toward the light guide panel 205d is reflected by the first pattern in a direction within a predetermined threshold range with reference to a direction perpendicular to the light guide panel 205d, and is emitted to the outside of the light guide panel 205d. The first pattern is formed in a line shape and thus the light emitted from the light guide panel 205d is emitted in the form of line light.

The light irradiated from the second light source 205c toward the light guide panel 205d is reflected by the second pattern in a direction within the predetermined threshold range with reference to the direction perpendicular to the light guide panel 205d, and is emitted to the outside of the light guide panel 205d. The second pattern is formed in a line shape and thus the light emitted from the light guide panel 205d is emitted in the form of line light.

That is, the light guide panel 205d generates the line light through the first light source 205b and the second light source 205c. The first light source 205b and the second light source 205c emit light serially under the control of the controller, and line light corresponding to the first pattern and line light corresponding to the second pattern are generated serially in the light guide panel 205d.

The controller 204 controls the overall operation of the 3D image display apparatus, receives information on the 3D image signal from the image processor, and controls the display 205 based on the received information. The controller 204 may control light emitting time of the first light source and the second light source. The controller 204 may control the first light source 205b and the second light source 205c to emit light based on information on the patterns formed in the light guide panel 205d. The information on the patterns may be determined in advance at the time when the 3D image display apparatus is manufactured. In addition, the controller 240 may control the first light source and the second light source to emit light based on user input. For example, in response to the user increasing the resolution of the 3D image by four times, the controller may control the light sources to emit light serially or control a light source of a wavelength to emit light to emit four times much line light for a same view point image and thus increase the resolution of the 3D image.

The second backlight 205e may be disposed on the rear surface of the light guide panel 205d to emit light when the display panel 205a displays a 2D image. The light emitted from the second backlight 205e passes through the light guide panel 205d and arrives at the display panel 205a, and thus a 2D image is displayed on the display panel.

The 3D image display apparatus may operate in a 3D mode for displaying a 3D image on the display panel 205a and a 2D mode for displaying a 2D image. When the 3D image display apparatus operates in the 3D mode, the controller 204 controls the first light source and the second light source to emit light alternately, and turns off the second backlight. When the 3D image display apparatus operates in the 2D mode, the controller 204 turns off the first light source and the second light source, and turns on the second backlight.

Figure 16:
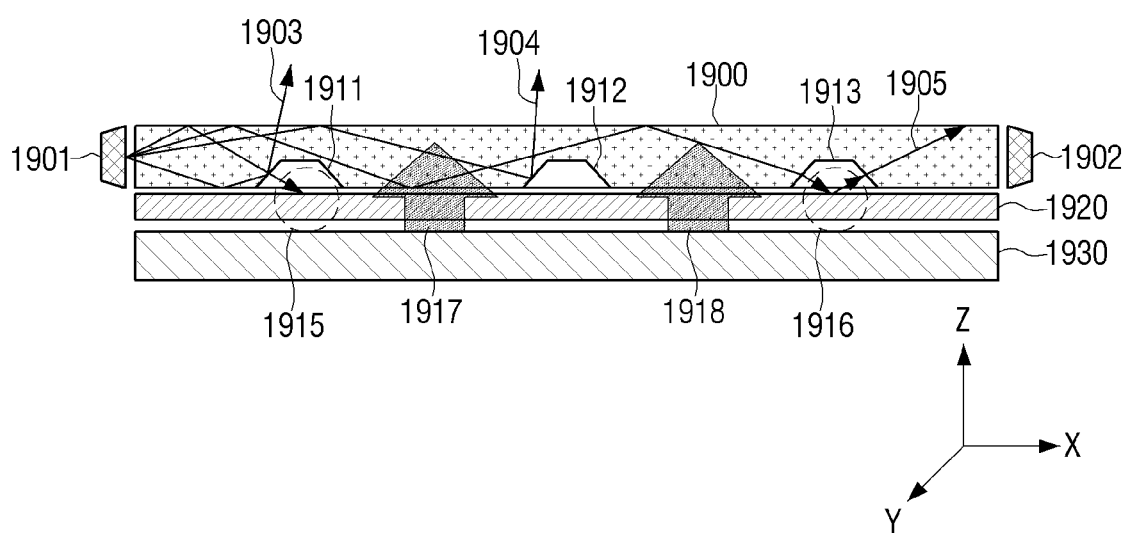
FIG. 16 is a view showing a backlight of a 3D image display apparatus according to another exemplary embodiment.

FIG. 16 is a view showing a backlight of a 3D image display apparatus according to another exemplary embodiment.

Referring to FIG. 16, a light guide panel 1900, a first light source 1901, a second light source 1902, a film member 1920, and a second backlight 1930 are illustrated.

The second backlight 1930 may be disposed on the rear surface of the light guide panel 1900 and may be used to display a 2D image on the display panel.

The light irradiated from the first light source is reflected in the light guide panel, and part of the light 1903, 1904 reflected by the patterns 1911, 1912, 1913 formed in the light guide panel in a direction within a predetermined threshold range with reference to a direction perpendicular to the light guide panel 1900 may be emitted to the outside of the light guide panel 1900. A part of the light is not reflected by the pattern 1913 and passes through the pattern 1913, and is emitted to the outside of the bottom of the light guide panel 1900. The light 1905 emitted to the outside of the light guide panel 1900 may be reflected by the film member 1920 and may return to the inside of the light guide panel 1900.

The film member 1920 may be disposed on the rear surface of the light guide panel. The film member 1920 may reflect light entering by a predetermined angle and may allow light entering in the perpendicular direction to pass therethrough. That is, the film member 1920 may reflect the light entering from the first light source 1901 and the second light source 1902 by a predetermined angle, and allow the light irradiated from the second backlight 1930 to pass therethrough. The light irradiated from the second backlight 1930 travels in the perpendicular direction 1917, 1918 (the z-axis direction), and passes through the light guide panel 1900 and is emitted to the outside of the light guide panel.

Alternatively, the film member 1920 may block the light entering by a predetermined angle to not allow the light to travel any more, and may allow the light entering in the perpendicular direction to pass therethrough. That is, the film member 1920 may block the light entering from the first light source 1901 and the second light source 1902 by a predetermined angle, and allow the light entering from the second backlight 1930 in the perpendicular direction to pass therethrough.

The second backlight 1930 may be used to display a 2D image. The second backlight 1930 may be disposed on the rear surface of the film member 1920. The light irradiated from the second backlight 1930 travels in the perpendicular direction (Z-axis direction), passes through the film member 1920 and the light guide panel 1900, and is emitted to the outside of the light guide panel.

Figure 17:
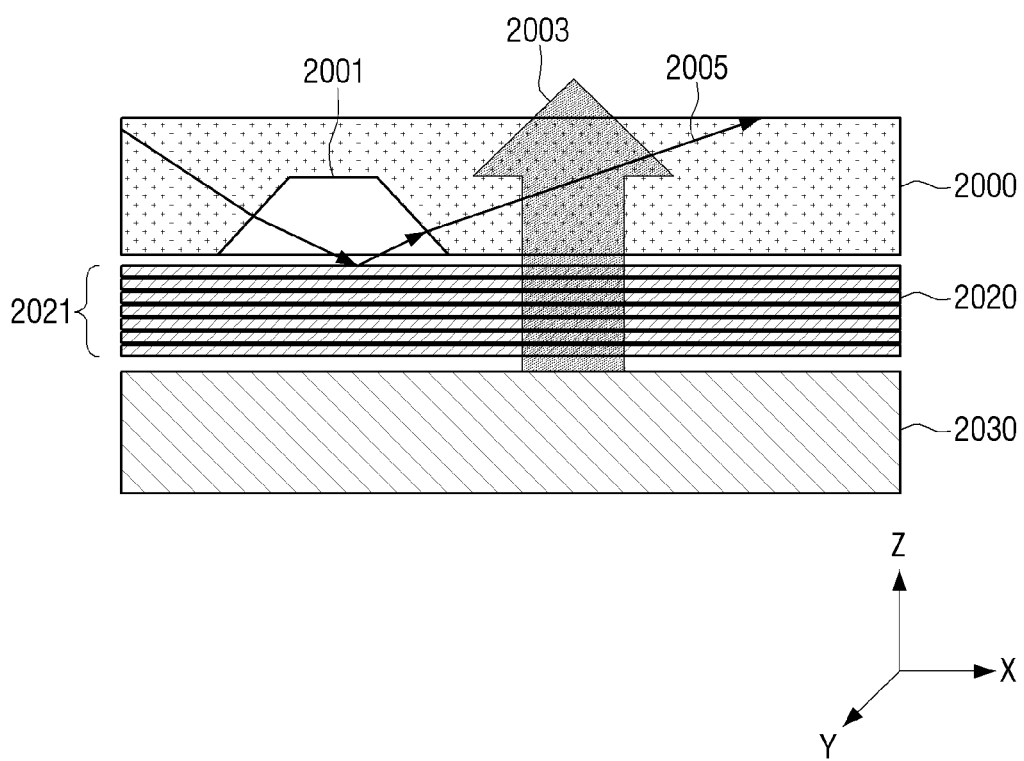
FIGS. 17 and 18 are views enlarging a film member which is used in a backlight of a 3D image display apparatus according to another exemplary embodiment.
Figure 18:
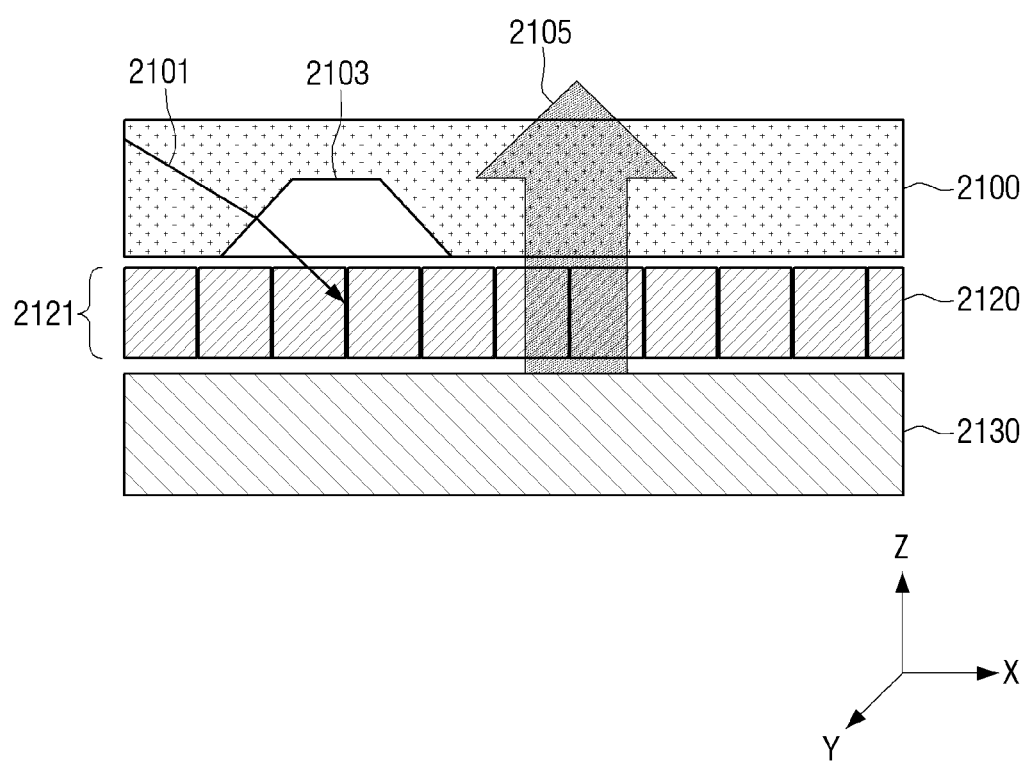

FIGS. 17 and 18 are views enlarging a film member which is used in a backlight of a 3D image display apparatus according to another exemplary embodiment. That is, the parts indicated by the dotted lines 1915, 1916 in FIG. 16 are enlarged and displayed.

Referring to FIG. 17, a light guide panel 2000, a pattern 2001, a film member 2020, and a second backlight 2030 are illustrated.

The film member 2020 may have a structure in which thin films 2021 are stacked. The respective thin films may have different refractive indexes and have different total reflection angles. Therefore, the film member 2020 may reflect the light irradiated from the first light source and the second light source by a predetermined angle, and return the light to the light guide panel. In addition, the film member 2020 may allow the light entering in the perpendicular direction (Z-axis direction) to pass therethrough, and the light irradiated from the second backlight disposed on the rear surface of the film member may pass through the film member and the light guide panel and travel.

For example, the light 2005 irradiated from the first light source may pass through the pattern 2001 and may be emitted to the rear surface of the light guide panel, but may be reflected by the film member 2020 and return to the inside of the light guide panel.

Referring to FIG. 18, a light guide panel 2100, a pattern 2103, a film member 2120, and a second backlight 2130 are illustrated.

In the film member 2120, blocking walls 2121 may be formed at regular intervals in the perpendicular direction (Z-axis direction). The blocking walls 2121 may block the light entering by a predetermined angle, and allow the light entering in the perpendicular direction to pass therethrough. That is, the light 2101 entering from the light guide panel with a predetermined angle is blocked, and the light 2105 irradiated from the second backlight in the perpendicular direction may pass through the film member 2120.

For example, the light 2101 irradiated from the first light source passes through the pattern 2103 and is emitted to the rear surface of the light guide panel, but is blocked by the blocking wall 2121 of the film member 2120.

Figure 19:
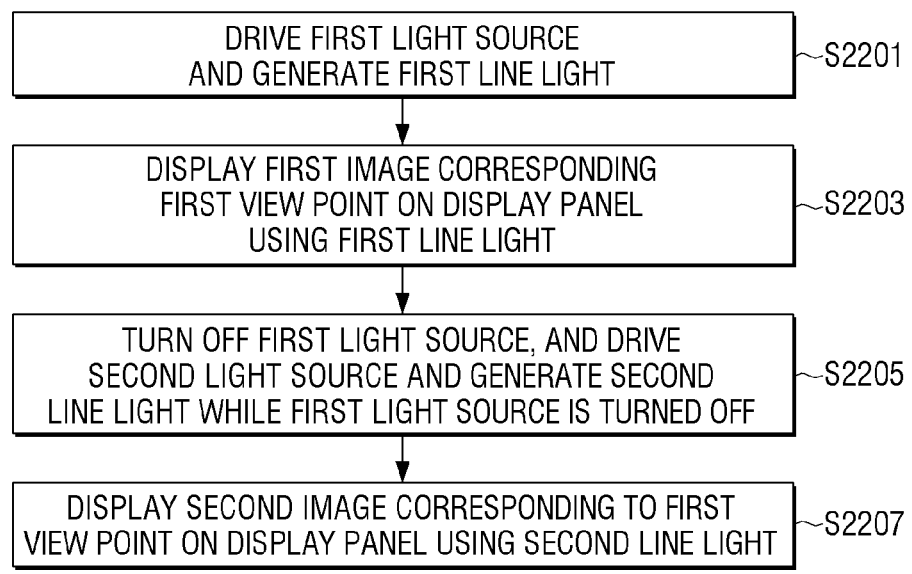
FIG. 19 is a view showing a processing method of a 3D image display apparatus according to an exemplary embodiment.

FIG. 19 is a view showing a processing method of a 3D image display apparatus according to an exemplary embodiment.

Referring to FIG. 19, the 3D image display apparatus may display a multi-view image on the display panel by emitting first line light and second line light from a light guide panel, which is disposed on a rear surface of the display panel and in which a first pattern and a second pattern are formed.

The 3D image display apparatus drives the first light source to irradiate light toward the light guide panel, and generate the first line light from the first pattern responding to the first light source (S2201). The second light source is turned off while the first light source is driven. The first pattern may be formed in the light guide panel in a line shape, and the first pattern may be formed in plural number. Because the first pattern is formed in the line shape, the light emitted from the light guide panel has a shape of line light. That is, when the first light source is driven, the first line light corresponding to the first light source may be generated in the light guide panel. Because the plurality of first patterns are formed, the first line light may be generated in plural number.

The 3D image display apparatus displays a first image corresponding to a first view point on the display panel using the first line light (S2203). The display panel may display a multi-view image. According to an exemplary embodiment, there may be a plurality of images corresponding to a single view point. For example, there may be two images corresponding to a first view point. The first view point image may include an even-numbered frame and an odd-numbered frame. That is, the image of the first view point may include a first image and a second image. Because the image of the same view point includes the even-numbered frame and the odd-numbered frame, the resolution may increase by two times. When the image of the same view point includes four frames, the resolution may increase by four times.

The 3D image display apparatus turns off the first light source, and drives the second light source to irradiate light toward the light guide panel and generates second line light from the second pattern responding to the second light source, while the first light source is turned off (S2205). The second pattern may be formed in the light guide panel in a line shape, and the second pattern may be formed in plural number. Because the second pattern is formed in the line shape, the light emitted from the light guide panel has a shape of line light. That is, when the second light source is driven, the second line light corresponding to the second light source may be generated in the light guide panel. In addition, because the plurality of second patterns are formed, the second line light may be generated in plural number.

The 3D image display apparatus displays a second image corresponding to the first view point on the display panel using the second line light (S2207). The first image and the second image are alternately displayed for the image of the first view point, and thus the resolution can increase by two times. In addition, the first image and the second image are alternately displayed for an image of a different view point in the same way, and the resolution for the entire 3D image can increase by two times.

The display method of 3D image display apparatus according to one or more exemplary embodiments described above may be implemented in a program to be provided to the display apparatus. The program including the display method of 3D image display apparatus may be stored and provided in a non-transitory computer readable medium.

The non-transitory computer-readable recording medium denotes a medium that semi-permanently stores data and is readable by a device, instead of a medium that stores data for a short time like registers, caches, and a memories. In detail, various applications or programs may be stored in a non-transitory computer-readable recording medium such as a CD, a DVD, a hard disk, a blue-ray disk, a USB memory, a memory card, or ROM. Furthermore, it is understood that one or more of the components, elements, units, etc., of the above-described apparatuses may be implemented in at least one hardware processor.

Although exemplary embodiments have been shown and described, it should be understood that the present disclosure is not limited to the exemplary embodiments and may be changed by those skilled in the art without departing from the spirit and the scope of the present disclosure.

What is claimed is:

1. A three-dimensional (3D) image display apparatus comprising:
   a display panel configured to display a 3D image;
   a light guide panel disposed on a rear surface of the display panel and configured to emit light toward the display panel;
   a first light source configured to irradiate light toward the light guide panel;
   a second light source configured to irradiate light toward the light guide panel; and
   a controller configured to control the first light source and the second light source to emit light alternately,
   wherein the light guide panel comprises:
      a first pattern configured to reflect the light from the first light source in a direction within a predetermined threshold range with respect to a direction perpendicular to the light guide panel, and reflect the light from the second light source in a direction that is outside of the predetermined threshold range, and
      a second pattern, which is not in direct contact with the first pattern, configured to reflect the light from the second light source in a direction within the predetermined threshold range with respect to a direction perpendicular to the light guide panel, and reflect the light from the first light source in a direction that is outside of the predetermined threshold range.

2. The 3D image display apparatus of claim 1, wherein the first light source and the second light source are disposed adjacent to a first side of the light guide panel.

3. The 3D image display apparatus of claim 2, wherein the first light source is configured to emit light having a first wavelength and the second light source is configured to emit light having a second wavelength.

4. The 3D image display apparatus of claim 1, wherein the first light source is disposed adjacent to a first side of the light guide panel and the second light source is disposed adjacent to a second side of the light guide panel.

5. The 3D image display apparatus of claim 4, wherein the light guide panel is disposed between the first light source and the second light source.

6. The 3D image display apparatus of claim 1, wherein the first pattern and the second pattern have cross sections that are asymmetrical triangles.

7. The 3D image display apparatus of claim 1, wherein the first pattern and the second pattern have cross sections that are symmetrical to each other.

8. The 3D image display apparatus of claim 1, wherein the first pattern and the second pattern have cross sections in a shape of ovals.

9. The 3D image display apparatus of claim 1, wherein the first pattern comprises a first surface and a second surface, and
   wherein the first surface is configured to reflect the light irradiated from the first light source in a direction within the predetermined threshold range, and emit the light to outside of the light guide panel, and the second surface is configured to reflect the light irradiated from the second light source in a direction that is outside of the predetermined threshold range.

10. The 3D image display apparatus of claim 1, wherein the second pattern comprises a first surface and a second surface, and
    wherein the first surface is configured to reflect the light irradiated from the second light source in a direction within the predetermined threshold range, and emit the light to an outside of the light guide panel, and the second surface is configured to reflect the light irradiated from the first light source in a direction that is outside of the predetermined threshold range.

11. The 3D image display apparatus of claim 1, wherein a view point image displayed on the display panel based on the light emitted from the first light source and a view point image displayed on the display panel based on the light emitted from the second light source correspond to images of a same view point.

12. The 3D image display apparatus of claim 1, wherein the first pattern and the second pattern are alternately formed in the light guide panel.

13. The 3D image display apparatus of claim 12, wherein a protrusion and a depression are alternately formed in the light guide panel, and the first pattern and the second pattern are formed in the protrusion.

14. The 3D image display apparatus of claim 1, further comprising a collimator lens disposed between the first light source and the light guide panel.

15. The 3D image display apparatus of claim 1, wherein the first pattern comprises a plurality of sub patterns, and a density of the sub patterns are changed according to a distance from the first light source.

16. The 3D image display apparatus of claim 1, wherein the light guide panel is disposed in parallel with the display panel.

17. The 3D image display apparatus of claim 1, further comprising:
    a third light source disposed adjacent to a third side of the light guide panel; and
    a fourth light source disposed adjacent to a fourth side of the light guide panel facing the third light source,
    wherein the light guide panel further comprises a third pattern and a fourth pattern formed therein, wherein the third pattern is configured to reflect the light from the third light source in a direction within the predetermined threshold range, and the fourth pattern is configured to reflect the light from the fourth light source in a direction within the predetermined threshold range.

18. The 3D image display apparatus of claim 17, wherein the controller is configured to control the first light source, the second light source, the third light source, and the fourth light source to emit light alternately.

19. The 3D image display apparatus of claim 1, further comprising:
    a second backlight disposed on a rear surface of the light guide panel configured to display a two-dimensional (2D) image on the display panel; and
    a film member disposed between the light guide panel and the second backlight and configured to reflect the light emitted from the first light source or the second light source and to allow the light emitted from the second backlight to pass through.

20. The 3D image display apparatus of claim 1, further comprising:
    a second backlight disposed on a rear surface of the light guide panel configured to display a two-dimensional (2D) image on the display panel; and
    a film member disposed between the light guide panel and the second backlight and configured to block the light emitted from the first light source or the second light source and to allow the light emitted from the second backlight to pass through.

21. A light guide panel in a three-dimensional (3D) image display apparatus, the light guide panel comprising:

a first light source disposed at a first edge of the light guide panel and configured to emit light toward the light guide panel, and a second light source disposed at a second edge of the light guide panel and configured to emit light toward the light guide panel;

a first pattern configured to reflect the light from the first light source in a direction within a predetermined threshold range with respect to a direction perpendicular to the light guide panel, and reflect the light from the second light source in a direction that is outside of the predetermined threshold range; and a second pattern, which is not in direct contact with the first pattern, configured to reflect the light from the second light source in a direction within the predetermined threshold range with respect to a direction perpendicular to the light guide panel and reflect the light from the first light source in a direction that is outside of the predetermined threshold range.

22. The light guide panel of claim 21, further comprising:

a third light source disposed at a third edge of the light guide panel and configured to emit light toward the light guide panel and a fourth light source disposed at a fourth edge of the light guide panel and configured to emit light toward the light guide panel;

a third pattern configured to reflect the light from the third light source in a direction within a predetermined threshold range with respect to a direction perpendicular to the light guide panel, and reflect the light from the fourth light source in a direction that is outside of the predetermined threshold range; and a fourth pattern configured to reflect the light from the fourth light source in a direction within a predetermined threshold range with respect to a direction perpendicular to the light guide panel and reflect the light from the third light source in a direction that is outside of the predetermined threshold range.

23. The light guide panel of claim 22, wherein the first pattern is configured to respond to light having a first wavelength and is configured to not respond to light having a second wavelength that is different from the first wavelength;

the second pattern is configured to respond to the light having the second wavelength and is configured to not respond to the light having the first wavelength;

the third pattern is configured to respond to light having a third wavelength and is configured to not respond to light having a fourth wavelength; and the fourth pattern is configured to respond to the light having the fourth wavelength and is configured to not respond to the light having the third wavelength.

24. The light guide panel of claim 22, wherein the first pattern, the second pattern, the third pattern, and the fourth pattern have cross sections in a shape of ovals.

25. The light guide panel of claim 21, wherein the first pattern is configured to respond to light having a first wavelength and is configured to not respond to light having a second wavelength that is different from the first wavelength, and the second pattern is configured to respond to the light having the second wavelength and is configured to not respond to the light having the first wavelength.

26. A three-dimensional (3D) image display apparatus comprising:

a display panel configured to display a 3D image;

a light guide panel disposed on a rear surface of the display panel and configured to emit light toward the display panel;

a first light source configured to irradiate light toward the light guide panel;

a second light source configured to irradiate light toward the light guide panel; and a controller configured to control the first light source and the second light source to emit light alternately, wherein the light guide panel comprises a first pattern configured to respond to the first light source and not respond to the second light source, and a second pattern, which is not in direct contact with the first pattern, configured to respond to the second light source and not respond to the first light source, and wherein the first pattern extends across entire light guide panel in a first direction and the second pattern extends across the entire light guide panel in the first direction, and the first pattern and the second pattern are alternately formed in a second direction across the entire light guide panel.

* * * * *